US010630822B2

(12) United States Patent
Mittleman et al.

(10) Patent No.: US 10,630,822 B2
(45) Date of Patent: Apr. 21, 2020

(54) MOUNTING STRUCTURES FOR PORTABLE ELECTRONIC DEVICES

(71) Applicant: Apple Inc., Cupertino, CA (US)

(72) Inventors: Adam D. Mittleman, Redwood City, CA (US); Kenneth A. Jenks, Cupertino, CA (US); Karen Y. Cheng, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/913,657

(22) Filed: Mar. 6, 2018

(65) Prior Publication Data

US 2018/0198895 A1 Jul. 12, 2018

Related U.S. Application Data

(60) Continuation of application No. 13/858,937, filed on Apr. 8, 2013, now Pat. No. 9,917,934, which is a division of application No. 12/113,908, filed on May 1, 2008, now Pat. No. 8,417,298.

(60) Provisional application No. 61/044,445, filed on Apr. 11, 2008, provisional application No. 61/041,532, filed on Apr. 1, 2008.

(51) Int. Cl.
*H04M 1/02* (2006.01)

(52) U.S. Cl.
CPC ......... *H04M 1/026* (2013.01); *H04M 1/0202* (2013.01)

(58) Field of Classification Search
CPC ............................ H04M 1/026; H04M 1/0202
See application file for complete search history.

(56) References Cited

U.S. PATENT DOCUMENTS

| | | |
|---|---|---|
| 5,229,744 A | 7/1993 | Ogura |
| 5,801,466 A | 9/1998 | Odagiri et al. |
| 5,943,214 A | 8/1999 | Sato et al. |
| 6,110,131 A | 8/2000 | Sleichter, III |
| 6,133,657 A | 10/2000 | Semenik et al. |
| 6,254,416 B1 | 7/2001 | Folan |
| 6,413,117 B1 | 7/2002 | Annerino et al. |
| 6,424,064 B2 | 7/2002 | Ibata et al. |
| 6,542,381 B1 | 4/2003 | Sei et al. |
| 6,600,937 B1 | 7/2003 | Horngren |

(Continued)

FOREIGN PATENT DOCUMENTS

JP 2007248230 9/2007

*Primary Examiner* — Nguyen T Vo
(74) *Attorney, Agent, or Firm* — Brownstein Hyatt Farber Schreck, LLP

(57) ABSTRACT

A portable electronic device such as a handheld electronic device is provided. The device may have upper and lower portions. The upper portion may have clips that attach to springs on the lower portion. The device may have a housing with a bezel. A prong on the springs may ground the bezel. A vibrator mounting bracket may hold a vibrator in place within the housing. The vibrator mounting bracket may have an end that engages the housing. A threaded insert may be welded to the spring. A screw that passes through a hole in the vibrator mounting bracket may be screwed into the threaded insert to attach the vibrator to the housing. An elastomeric member may bias the vibrator towards the bracket. An acoustic module may serve as a subassembly for the device. Components such as an antenna, dock connector, microphone, and speaker may be attached to the acoustic module.

16 Claims, 21 Drawing Sheets

(56) References Cited

U.S. PATENT DOCUMENTS

| | | | |
|---|---|---|---|
| 7,268,673 B2 | 9/2007 | Wolff | |
| 7,492,602 B2 * | 2/2009 | Kim | G06F 1/1626 174/520 |
| 8,417,298 B2 | 4/2013 | Mittleman | |
| 2001/0019377 A1 * | 9/2001 | Fukayama | G02F 1/133308 349/58 |
| 2006/0292439 A1 * | 12/2006 | Zuo | H01M 2/1066 429/97 |
| 2008/0238269 A1 * | 10/2008 | Yamanaka | H04N 5/64 312/7.2 |
| 2009/0257207 A1 | 10/2009 | Wang et al. | |

* cited by examiner

MOUNTING STRUCTURES FOR PORTABLE ELECTRONIC DEVICES

This application is a continuation patent application of U.S. patent application Ser. No. 13/858,937, filed Apr. 8, 2013 and titled "Mounting Structures for Portable Electronic Devices," now U.S. Pat. No. 9,917,934, which is a divisional patent application of U.S. patent application Ser. No. 12/113,908, filed May 1, 2008 and titled "Mounting Structures for Portable Electronic Devices," now U.S. Pat. No. 8,417,298, which claims the benefit of U.S. Provisional Patent Application No. 61/044,445, filed Apr. 11, 2008 and titled "Portable Electronic Device with Two-Piece Housing" and U.S. Provisional Patent Application No. 61/041,532, filed Apr. 1, 2008 and titled "Microphone Packaging in a Mobile Communications Device," the disclosures of which are hereby incorporated by reference herein in their entireties.

BACKGROUND

This invention relates to portable electronic devices, and more particularly, to support structures for portable electronic devices such as handheld electronic devices.

Handheld electronic devices and other portable electronic devices are becoming increasingly popular. Examples of handheld devices include handheld computers, cellular telephones, media players, and hybrid devices that include the functionality of multiple devices of this type. Popular portable electronic devices that are somewhat larger than traditional handheld electronic devices include laptop computers and tablet computers.

To satisfy consumer demand for small form factor devices such as handheld electronic devices, manufacturers are continually striving to reduce the size of components that are used in these devices while providing enhanced functionality and manufacturability. Significant enhancements may be difficult to implement, however, particularly in devices in which numerous components must be mounted within a confined area.

It would therefore be desirable to be able to provide improved support structures for handheld electronic devices.

SUMMARY

A portable electronic device such as a handheld electronic device is provided. The device may have an upper portion and a lower portion. The upper portion, which may sometimes be referred to as a tilt assembly, may include components such as a display, touch screen, and housing frame. The lower portion, which may sometimes be referred to as a housing assembly, may include a housing, printed circuit boards, and electrical components that are mounted to the housing and printed circuit boards. The upper portion may have clips that attach to springs on the lower portion. In a finished device, the upper portion may be mounted in the lower portion and spring prongs on the springs may protrude into mating holes in the clips. Spring prongs on the springs may also be used to form a ground connection to a conductive bezel in the housing assembly.

The springs on the lower portion may be used in supporting electrical components such as a vibrator. A vibrator may be held in place against an elastomeric member by a bracket. The elastomeric member may rest on the device housing. The bracket may be attached to the device by screws or other fasteners or other suitable techniques. For example, the bracket may have a hook that engages a protruding member in the device housing and may have a screw hole through which the bracket may be screwed in place with a screw. The screw may mate with a treaded metal insert that is welded to one of the springs in the housing assembly. The springs may be welded to a conductive bezel in the housing assembly.

An acoustic module in the electronic device may be used as a speaker enclosure and may be used to support components such as an antenna, a microphone, a speaker, and a dock connector. When components such as the antenna, microphone, speaker, and dock connector are mounted to the speaker enclosure, the acoustic module may serve as a finished subassembly for the handheld electronic device.

Further features of the invention, its nature and various advantages will be more apparent from the accompanying drawings and the following detailed description of the preferred embodiments.

DETAILED DESCRIPTION

The present invention relates generally to electronic devices, and more particularly, to portable electronic devices such as handheld electronic devices.

The electronic devices may be portable electronic devices such as laptop computers or small portable computers of the type that are sometimes referred to as ultraportables. Portable electronic devices may also be somewhat smaller devices. Examples of smaller portable electronic devices include wrist-watch devices, pendant devices, headphone and earpiece devices, and other wearable and miniature devices. With one suitable arrangement, the portable electronic devices may be wireless electronic devices.

The wireless electronic devices may be, for example, handheld wireless devices such as cellular telephones, media players with wireless communications capabilities, handheld computers (also sometimes called personal digital assistants), remote controllers, global positioning system (GPS) devices, and handheld gaming devices. The wireless electronic devices may also be hybrid devices that combine the functionality of multiple conventional devices. Examples of hybrid portable electronic devices may include a cellular telephone that includes media player functionality, a gaming device that includes a wireless communications capability, a cellular telephone that includes game and email functions, and a portable device that receives email, supports mobile telephone calls, has music player functionality and supports web browsing. These are merely illustrative examples.

Figure 1:
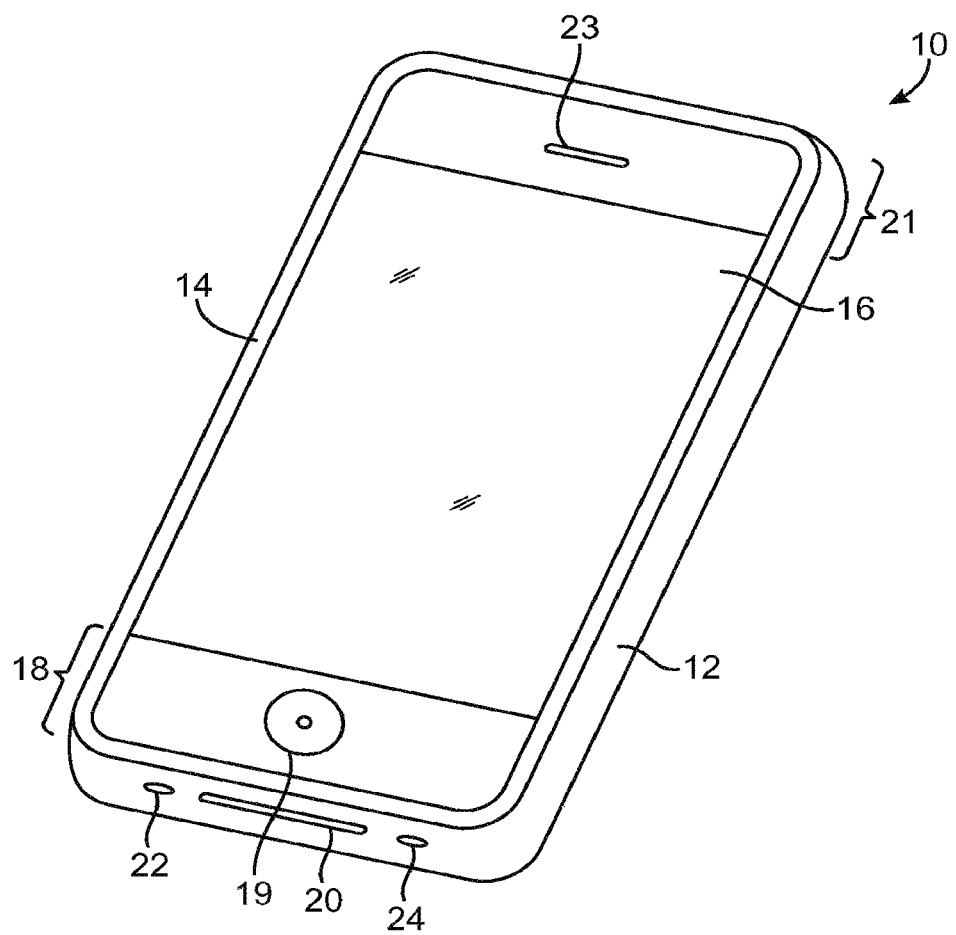
FIG. 1 is a perspective view of an illustrative portable electronic device in accordance with an embodiment of the present invention.

An illustrative portable electronic device in accordance with an embodiment of the present invention is shown in FIG. 1. Device 10 of FIG. 1 may be, for example, a handheld electronic device that supports 2G and/or 3G cellular telephone and data functions, global positioning system capabilities, and local wireless communications capabilities (e.g., IEEE 802.11 and Bluetooth®) and that supports handheld computing device functions such as internet browsing, email and calendar functions, games, music player functionality, etc.

Device 10 may have housing 12. Antennas for handling wireless communications may be housed within housing 12 (as an example).

Housing 12, which is sometimes referred to as a case, may be formed of any suitable materials including, plastic, glass, ceramics, metal, or other suitable materials, or a combination of these materials. In some situations, housing 12 or portions of housing 12 may be formed from a dielectric or other low-conductivity material. Housing 12 or portions of housing 12 may also be formed from conductive materials such as metal. An advantage of forming housing 12 from a dielectric material such as plastic is that this may help to reduce the overall weight of device 10 and may avoid potential interference with wireless operations.

In scenarios in which housing 12 is formed from metal elements, one or more of the metal elements may be used as part of the antennas in device 10. For example, metal portions of housing 12 may be shorted to an internal ground plane in device 10 to create a larger ground plane element for that device 10.

Housing 12 may have a bezel 14. The bezel 14 may be formed from a conductive material and may serve to hold a display or other device with a planar surface in place on device 10 and to form an esthetically pleasing trim around the edge of device 10. As shown in FIG. 1, for example, bezel 14 may be used to surround the top of display 16. Bezel 14 and other metal elements associated with device 10 may be used as part of the antennas in device 10. For example, bezel 14 may be shorted to printed circuit board conductors, metal frame structures, or other internal ground plane structures in device 10 to create a larger ground plane element for device 10.

Display 16 may be a liquid crystal display (LCD), an organic light emitting diode (OLED) display, or any other suitable display. The outermost surface of display 16 may be formed from one or more plastic or glass layers. If desired, touch screen functionality may be integrated into display 16 or may be provided using a separate touch pad device. An advantage of integrating a touch screen into display 16 to make display 16 touch sensitive is that this type of arrangement can save space and reduce visual clutter.

Display 16 (e.g., a touch screen) is merely one example of an input-output device that may be used with electronic device 10. If desired, electronic device 10 may have other input-output devices. For example, electronic device 10 may have user input control devices such as button 19, and input-output components such as port 20 and one or more input-output jacks (e.g., for audio and/or video). Button 19 may be, for example, a menu button. Port 20 may contain a multipin (e.g., a 30-pin) input-output connector (as an example). Openings 22 and 24 may, if desired, form speaker and microphone ports. Speaker port 22 may be used when operating device 10 in speakerphone mode. Opening 23 may also form a speaker port. For example, speaker port 23 may serve as a telephone receiver that is placed adjacent to a user's ear during operation. In the example of FIG. 1, display screen 16 is shown as being mounted on the front face of handheld electronic device 10, but display screen 16 may, if desired, be mounted on the rear face of handheld electronic device 10, on a side of device 10, on a flip-up portion of device 10 that is attached to a main body portion of device 10 by a hinge (for example), or using any other suitable mounting arrangement.

A user of electronic device 10 may supply input commands using user input interface devices such as button 19 and touch screen 16. Suitable user input interface devices for electronic device 10 include buttons (e.g., alphanumeric keys, power on-off, power-on, power-off, and other specialized buttons, etc.), a touch pad, pointing stick, or other cursor control device, a microphone for supplying voice commands, or any other suitable interface for controlling device 10. Although shown schematically as being formed on the top face of electronic device 10 in the example of FIG. 1, buttons such as button 19 and other user input interface devices may generally be formed on any suitable portion of electronic device 10. For example, a button such as button 19 or other user interface control may be formed on the side of electronic device 10. Buttons and other user interface controls can also be located on the top face, rear face, or other portion of device 10. If desired, device 10 can be controlled remotely (e.g., using an infrared remote control, a radio-frequency remote control such as a Bluetooth® remote control, etc.).

Electronic device 10 may have ports such as port 20. Port 20, which may sometimes be referred to as a dock connector, 30-pin data port connector, multipin input-output connector, input-output port, or bus connector, may be used as an input-output port (e.g., when connecting device 10 to a mating dock connected to a computer or other electronic device). Port 20 may contain pins for receiving data and power signals. Device 10 may also have audio and video jacks that allow device 10 to interface with external components. Typical ports include power pins to recharge a battery within device 10 or to operate device 10 from a direct current (DC) power supply, data pins to exchange data with external components such as a personal computer or peripheral, audio-visual jacks to drive headphones, a monitor, or other external audio-video equipment, a subscriber identity module (SIM) card port to authorize cellular telephone service, a memory card slot, etc. The functions of some or all of these devices and the internal circuitry of electronic device 10 can be controlled using input interface devices such as touch screen display 16.

Components such as display 16 and other user input interface devices may cover most of the available surface area on the front face of device 10 (as shown in the example of FIG. 1) or may occupy only a small portion of the front face of device 10.

Figure 2:
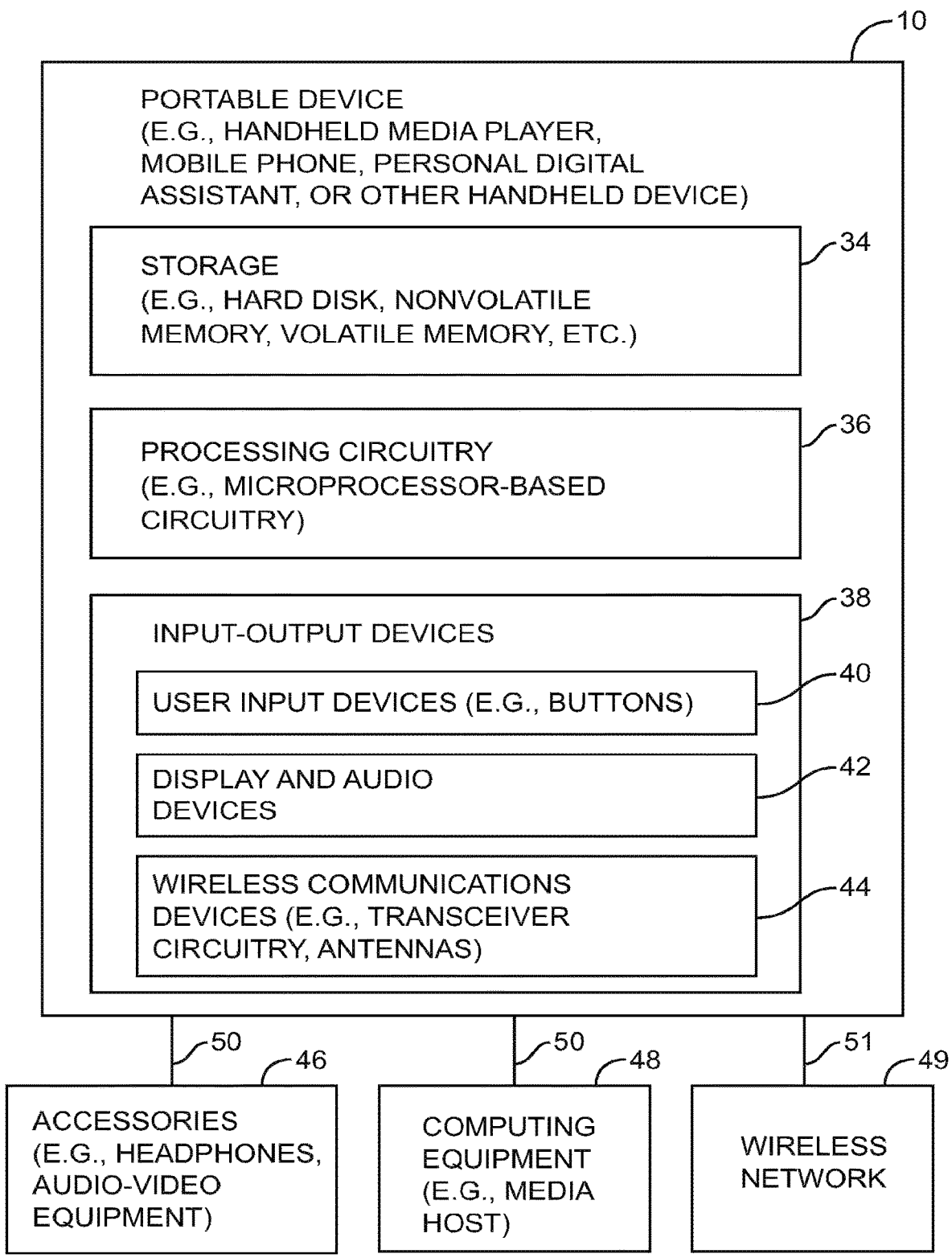
FIG. 2 is a schematic diagram of an illustrative portable electronic device in accordance with an embodiment of the present invention.

A schematic diagram of an embodiment of an illustrative portable electronic device such as a handheld electronic device is shown in FIG. 2. Portable device 10 may be a mobile telephone, a mobile telephone with media player capabilities, a handheld computer, a remote control, a game player, a global positioning system (GPS) device, a laptop computer, a tablet computer, an ultraportable computer, a hybrid device that includes the functionality of some or all of these devices, or any other suitable portable electronic device.

As shown in FIG. 2, device 10 may include storage 34. Storage 34 may include one or more different types of storage such as hard disk drive storage, nonvolatile memory (e.g., flash memory or other electrically-programmable-read-only memory), volatile memory (e.g., battery-based static or dynamic random-access-memory), etc.

Processing circuitry 36 may be used to control the operation of device 10. Processing circuitry 36 may be based on a processor such as a microprocessor and other suitable integrated circuits. With one suitable arrangement, processing circuitry 36 and storage 34 are used to run software on device 10, such as internet browsing applications, voice-over-internet-protocol (VOIP) telephone call applications, email applications, media playback applications, operating system functions, etc. Processing circuitry 36 and storage 34 may be used in implementing suitable communications protocols. Communications protocols that may be implemented using processing circuitry 36 and storage 34 include internet protocols, wireless local area network protocols (e.g., IEEE 802.11 protocols—sometimes referred to as Wi-Fi®), protocols for other short-range wireless communications links such as the Bluetooth® protocol, protocols for handling 3G communications services (e.g., using wide band code division multiple access techniques), 2G cellular telephone communications protocols, etc.

Input-output devices 38 may be used to allow data to be supplied to device 10 and to allow data to be provided from device 10 to external devices. Display screen 16, button 19, microphone port 24, speaker port 22, and dock connector port 20 are examples of input-output devices 38.

Input-output devices 38 can include user input-output devices 40 such as buttons, touch screens, joysticks, click wheels, scrolling wheels, touch pads, key pads, keyboards, microphones, cameras, vibrators, etc. A user can control the operation of device 10 by supplying commands through user input devices 40. Display and audio devices 42 may include liquid-crystal display (LCD) screens or other screens, light-emitting diodes (LEDs), and other components that present visual information and status data. Display and audio devices 42 may also include audio equipment such as speakers and other devices for creating sound. Display and audio devices 42 may contain audio-video interface equipment such as jacks and other connectors for external headphones and monitors.

Wireless communications devices 44 may include communications circuitry such as radio-frequency (RF) transceiver circuitry formed from one or more integrated circuits, power amplifier circuitry, passive RF components, antennas, and other circuitry for handling RF wireless signals. Wireless signals can also be sent using light (e.g., using infrared communications).

Device 10 can communicate with external devices such as accessories 46, computing equipment 48, and wireless network 49 as shown by paths 50 and 51. Paths 50 may include wired and wireless paths. Path 51 may be a wireless path. Accessories 46 may include headphones (e.g., a wireless cellular headset or audio headphones) and audio-video equipment (e.g., wireless speakers, a game controller, or other equipment that receives and plays audio and video content), a peripheral such as a wireless printer or camera, etc.

Computing equipment 48 may be any suitable computer. With one suitable arrangement, computing equipment 48 is a computer that has an associated wireless access point (router) or an internal or external wireless card that establishes a wireless connection with device 10. The computer may be a server (e.g., an internet server), a local area network computer with or without internet access, a user's own personal computer, a peer device (e.g., another portable electronic device 10), or any other suitable computing equipment.

Wireless network 49 may include any suitable network equipment, such as cellular telephone base stations, cellular towers, wireless data networks, computers associated with wireless networks, etc. For example, wireless network 49 may include network management equipment that monitors the wireless signal strength of the wireless handsets (cellular telephones, handheld computing devices, etc.) that are in communication with network 49.

To facilitate manufacturing operations, device 10 may be formed from two intermediate assemblies, representing upper and lower portions of device 10. The upper or top portion of device 10 is sometimes referred to as a tilt assembly. The lower or bottom portion of device 10 is sometimes referred to as a housing assembly.

The tilt and housing assemblies may each be formed from a number of smaller components. For example, the tilt assembly may be formed from components such as display 16 and an associated touch sensor. The housing assembly may include a plastic housing portion and printed circuit boards. Integrated circuits and other components may be mounted on the printed circuit boards.

During initial manufacturing operations, the tilt assembly may be formed from its constituent parts and the housing assembly may be formed from its constituent parts (individual components and subassemblies). Because essentially all components in device 10 make up part of these two assemblies with this type of arrangement, the finished assemblies represent a nearly complete version of device 10. The finished assemblies may, if desired, be tested. If testing reveals a defect, repairs may be made or defective assemblies may be discarded. During a final set of manufacturing operations, the tilt assembly may be inserted into the housing assembly. With one suitable arrangement, one end of the tilt assembly may be inserted into the housing assembly. The tilt assembly may then be rotated ("tilted") into place so that the upper surface of the tilt assembly lies flush with the upper edges of the housing assembly.

As the tilt assembly is rotated into place within the housing assembly, clips on the tilt assembly can engage springs on the housing assembly. The clips and springs may form a detent that helps to align the tilt assembly properly with the housing assembly. Should rework or repair by necessary, the insertion process can be reversed by rotating the tilt assembly up and away from the housing assembly. During rotation of the tilt assembly relative to the housing assembly, the springs may flex to accommodate movement. When the tilt assembly is located within the housing assembly, the springs may press into holes in the clips to prevent relative movement between the tilt and housing assemblies. Rework and repair operations need not be destructive to the springs, clips, and other components in the device. This helps to prevent waste and complications that might otherwise interfere with the manufacturing of device 10.

If desired, screws or other fasteners may be used to help secure the tilt assembly to the housing assembly. The screws may be inserted into the lower end of device 10. With one suitable arrangement, the screws may be inserted in an unobtrusive portion of the end of device 10 so that they are not noticeable following final assembly operations. Prior to rework or repair operations, the screws can be removed from device 10.

Figure 3:
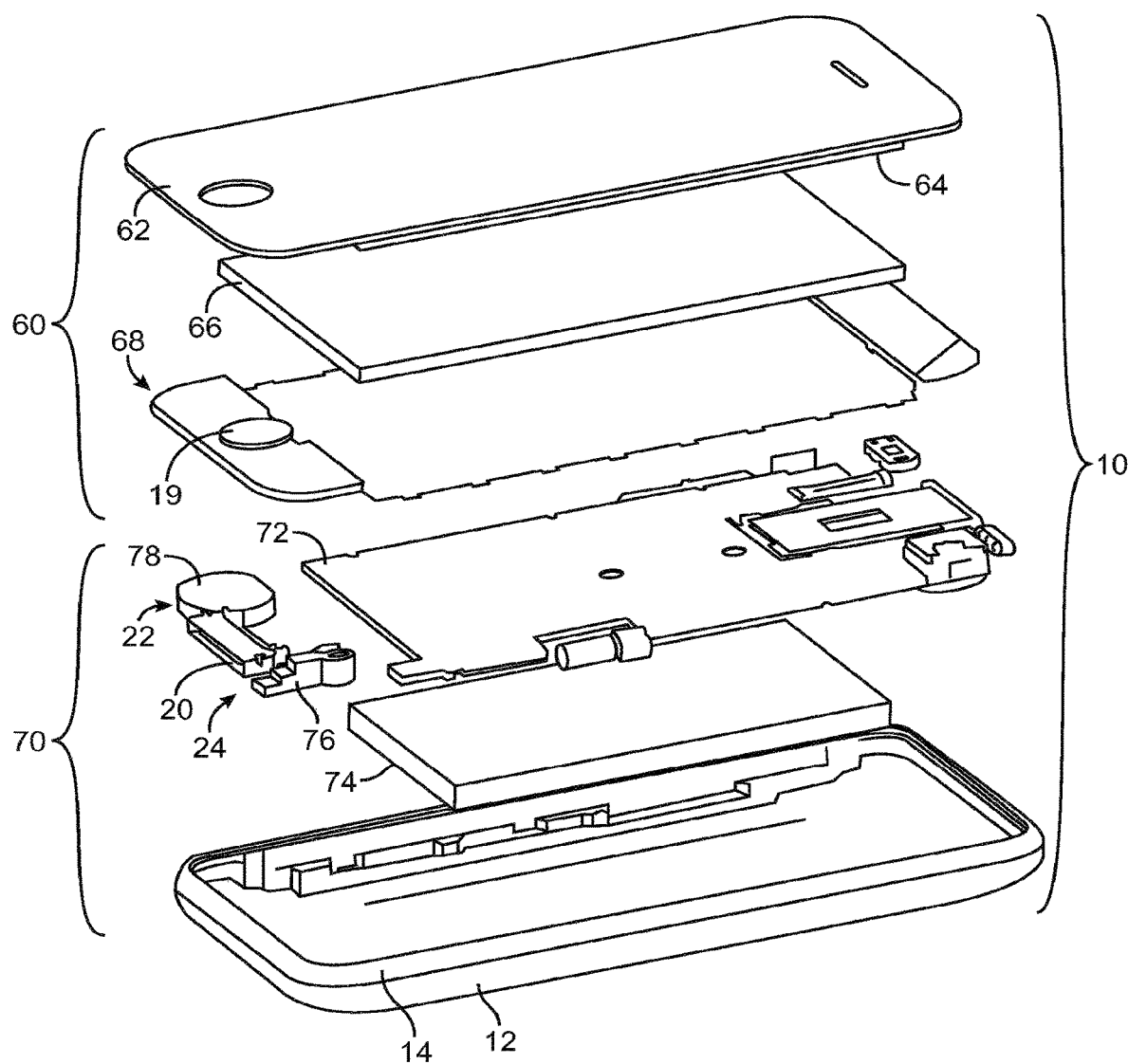
FIG. 3 is an exploded perspective view of an illustrative portable electronic device in accordance with an embodiment of the present invention.

An exploded perspective view showing illustrative components of device 10 is shown in FIG. 3.

Tilt assembly 60 (shown in its unassembled state in FIG. 3) may include components such as cover 62, touch sensitive sensor 64, display unit 66, and frame 68. Cover 62 may be formed of glass or other suitable transparent materials (e.g., plastic, combinations of one or more glasses and one or more plastics, etc.). Display unit 66 may be, for example, a color liquid crystal display. Frame 68 may be formed from one or more pieces. With one suitable arrangement, frame 68 may include metal pieces to which plastic parts are connected using an overmolding process. If desired, frame 68 may be formed entirely from plastic or entirely from metal.

Housing assembly 70 (shown in its unassembled state in FIG. 3) may include housing 12. Housing 12 may be formed of plastic and/or other materials such as metal (metal alloys). For example, housing 12 may be formed of plastic to which metal members are mounted using fasteners, a plastic overmolding process, or other suitable mounting arrangement.

As shown in FIG. 3, handheld electronic device 10 may have a bezel such as bezel 14. Bezel 14 may be formed of plastic or other dielectric materials or may be formed from metal or other conductive materials. An advantage of a metal (metal alloy) bezel is that materials such as metal may provide bezel 14 with an attractive appearance and may be durable. If desired, bezel 14 may be formed from shiny plastic or plastic coated with shiny materials such as metal films.

Bezel 14 may be mounted to housing 12. Following final assembly, bezel 14 may surround the display of device 10 and may, if desired, help secure the display onto device 10. Bezel 14 may serve as a cosmetic trim member that provides an attractive finished appearance to device 10.

Housing assembly 70 may include battery 74. Battery 74 may be, for example, a lithium polymer battery having a capacity of about 1300 mA-hours. Battery 74 may have spring contacts that allow battery 74 to be serviced.

Housing assembly 70 may also include one or more printed circuit boards such as printed circuit board 72. Housing assembly 70 may also include components such as microphone 76 for microphone port 24, speaker 78 for speaker port 22, and dock connector 20, integrated circuits, a camera, ear (receiver) speaker, audio jack, buttons, SIM card slot, etc.

Figure 4:
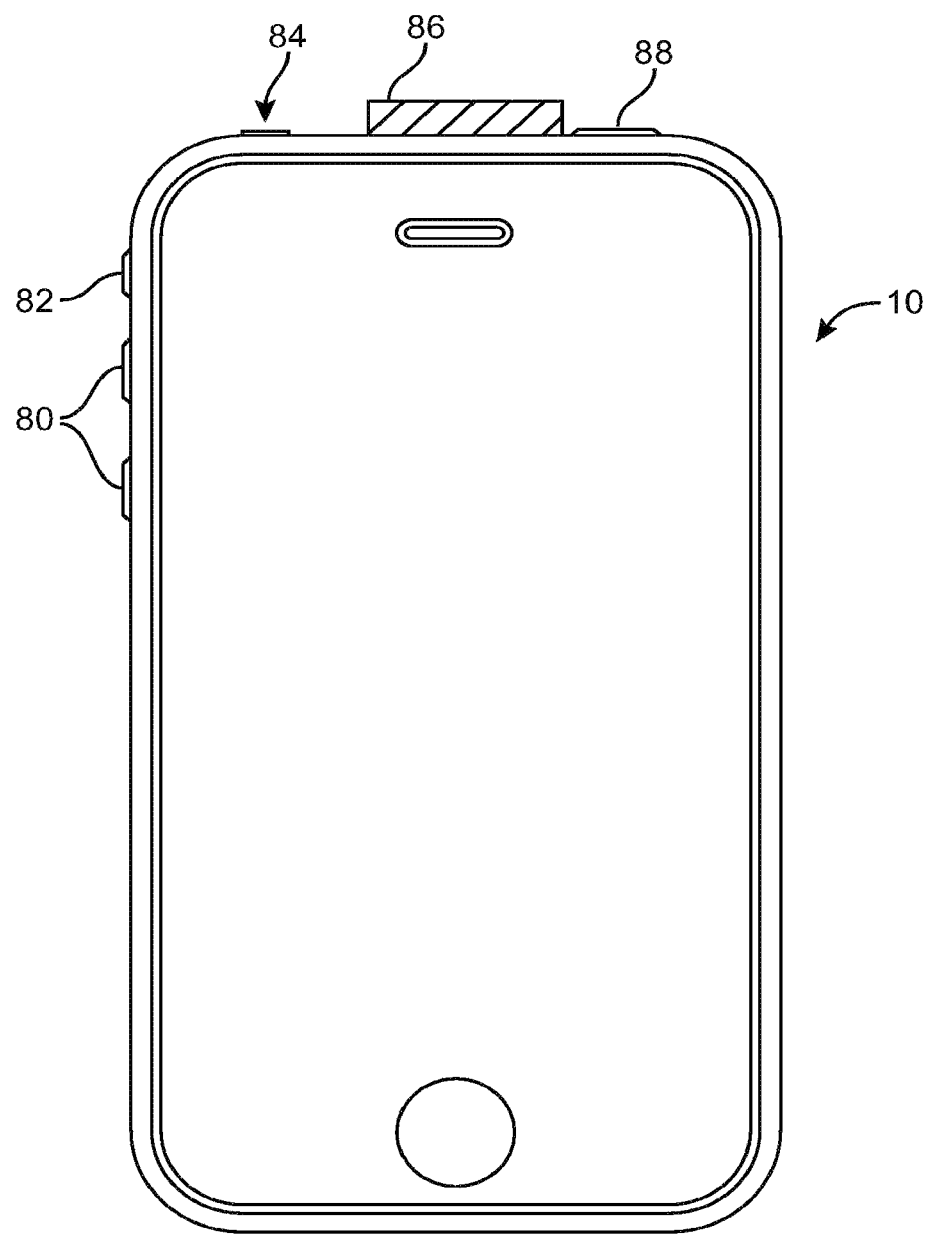
FIG. 4 is a top view of an illustrative portable electronic device in accordance with an embodiment of the present invention.

A top view of an illustrative device 10 is shown in FIG. 4. As shown in FIG. 4, device 10 may have controller buttons such as volume up and down buttons 80, a ringer A/B switch 82 (to switch device 10 between ring and vibrate modes), and a hold button 88 (sleep/wake button). A subscriber identity module (SIM) tray 86 (shown in a partially extended state) may be used to receive a SIM card for authorizing cellular telephone services. Audio jack 84 may be used for attaching audio peripherals to device 10 such as headphone, a headset, etc.

Figure 5:
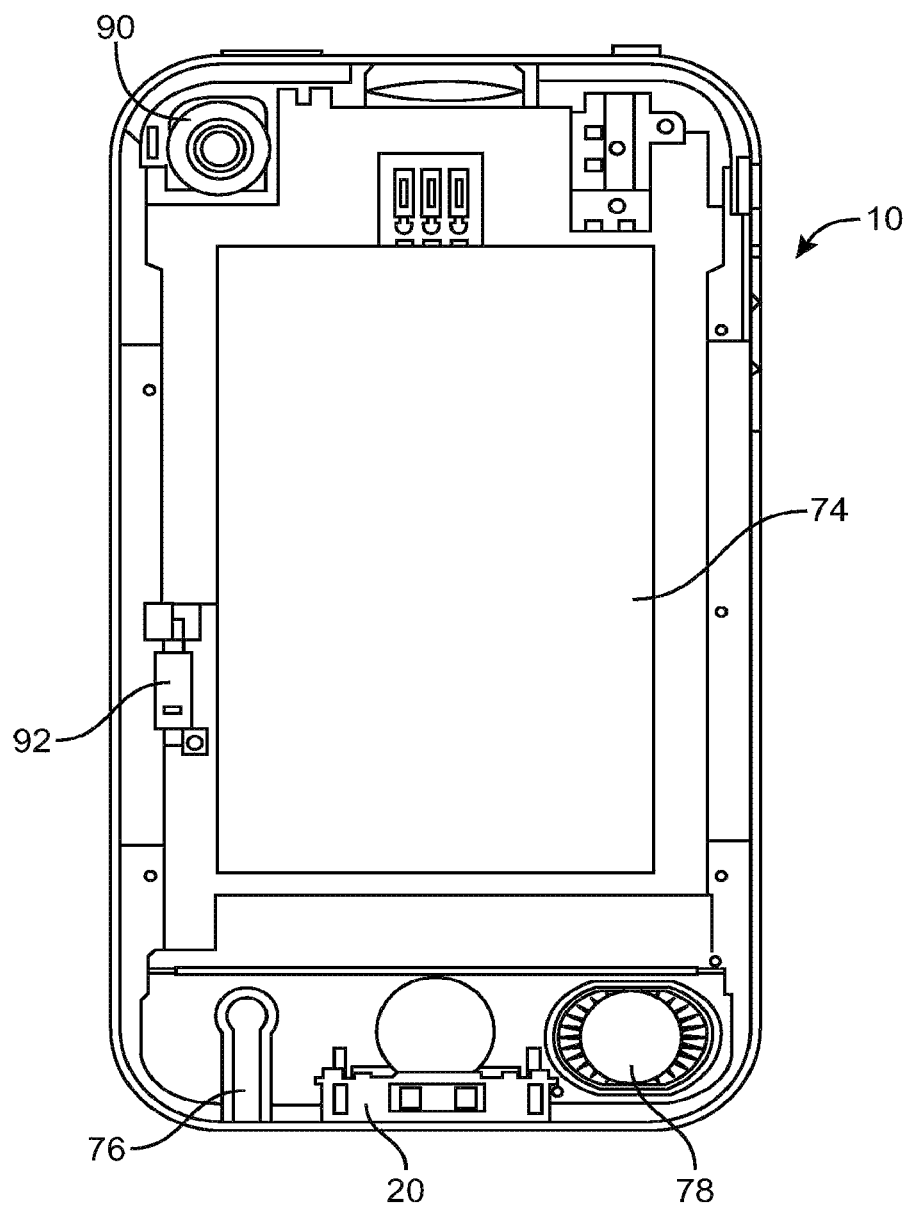
FIG. 5 is an interior bottom view of an illustrative portable electronic device in accordance with an embodiment of the present invention.

An interior bottom view of device 10 is shown in FIG. 5. As shown in FIG. 5, device 10 may have a camera 90. Camera 90 may be, for example, a two megapixel fixed focus camera.

Vibrator 92 may be used to vibrate device 10. Device 10 may be vibrated at any suitable time. For example, device 10 may be vibrated to alert a user to the presence of an incoming telephone call, an incoming email message, a calendar reminder, a clock alarm, etc.

Battery 74 may be a removable battery that is installed in the interior of device 10 adjacent to dock connector 20, microphone 76, and speaker 78.

Figure 6:
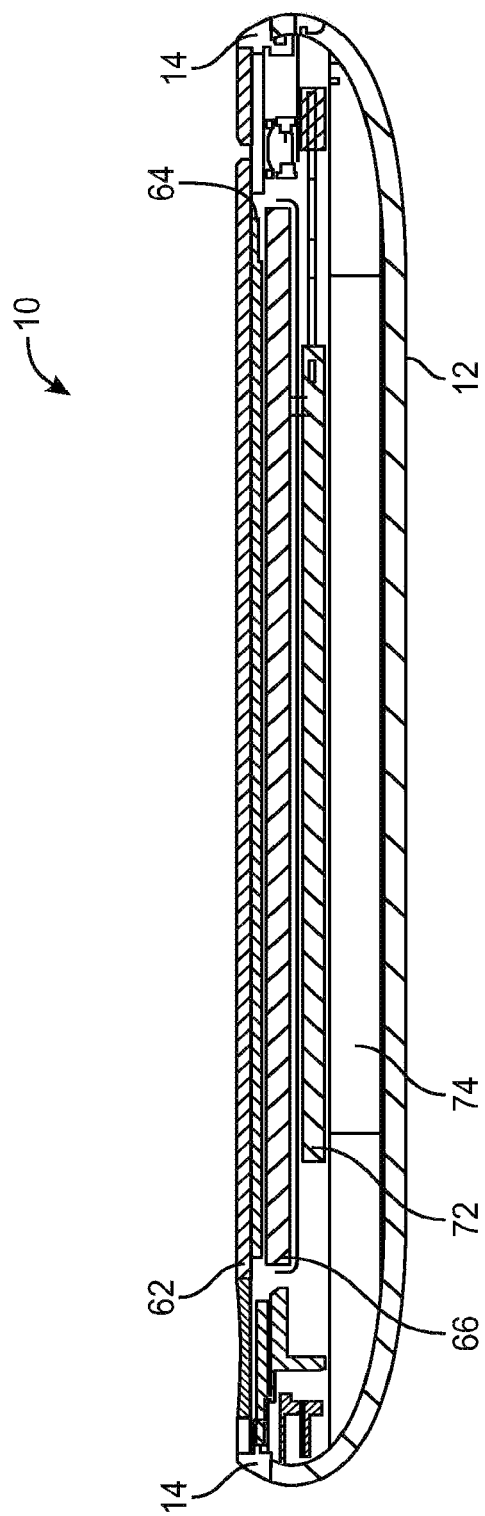
FIG. 6 is a cross-sectional side view of an illustrative portable electronic device in accordance with an embodiment of the present invention.

A cross-sectional side view of device 10 is shown in FIG. 6. FIG. 6 shows the relative vertical positions of device components such as housing 12, battery 74, printed circuit board 72, liquid crystal display unit 66, touch sensor 64, and cover glass 62 within device 10. FIG. 6 also shows how bezel 14 may surround the top edge of device 10 (e.g., around the portion of device 10 that contains the components of display 16 such as cover 62, touch screen 64, and display unit 66). Bezel 14 may be a separate component or, if desired, one or more bezel-shaped structures may be formed as integral parts of housing 12 or other device structures.

Figure 7:
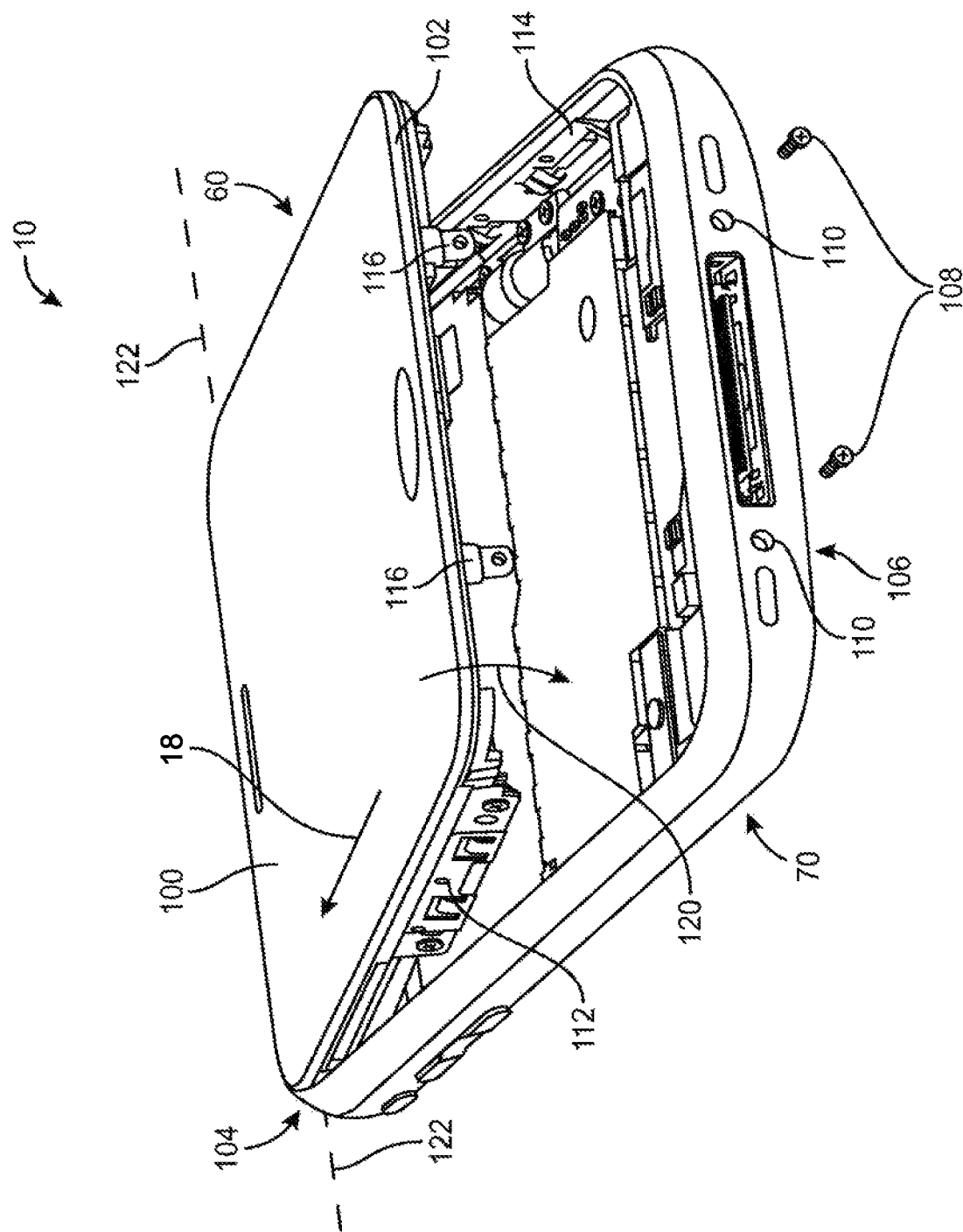
FIG. 7 is a perspective view of a partially assembled portable electronic device in accordance with an embodiment of the present invention showing how an upper portion of the device may be inserted into a lower portion of the device.

An illustrative process for assembling device 10 from tilt assembly 60 and housing assembly 70 is shown in FIG. 7.

As shown in FIG. 7, the assembly process may begin by inserting upper end 100 of tilt assembly 60 into upper end 104 of housing assembly 70. This process involves inserting tilt assembly 60 into housing assembly 70 along direction 18 until protrusions on the upper end of tilt assembly 60 engage mating holes on housing assembly 70. Once the protrusions on tilt assembly 60 have engaged with housing assembly 70, lower end 102 of tilt assembly 60 may be inserted into lower end 106 of housing assembly 70. Lower end 102 may be inserted into lower end 106 by pivoting tilt assembly 60 about axis 122. This causes tilt assembly 60 to rotate into place as indicated by arrow 120.

Tilt assembly 60 may have clips such as clips 112 and housing assembly 70 may have matching springs 114. When tilt assembly 60 is rotated into place within housing assembly 70, the springs and clips mate with each other to hold tilt assembly 60 in place within housing assembly 70.

Tilt assembly 60 may have one or more retention clips such as retention clips 116. Retention clips 116 may have threaded holes that mate with screws 108. After tilt assembly has been inserted into housing assembly, screws 108 may be screwed into retention clips 116 through holes 110 in housing assembly 70. This helps to firmly secure tilt assembly 60 to housing assembly 70. Should rework or repair be desired, screws 108 may be removed from retention clips 116 and tilt assembly 60 may be released from housing assembly 70. During the removal of tilt assembly 60 from housing assembly 70, springs 114 may flex relative to clips 112 without permanently deforming. Because no damage is done to tilt assembly 60 or housing assembly 70 in this type of scenario, nondestructive rework and repair operations are possible.

Figure 8:
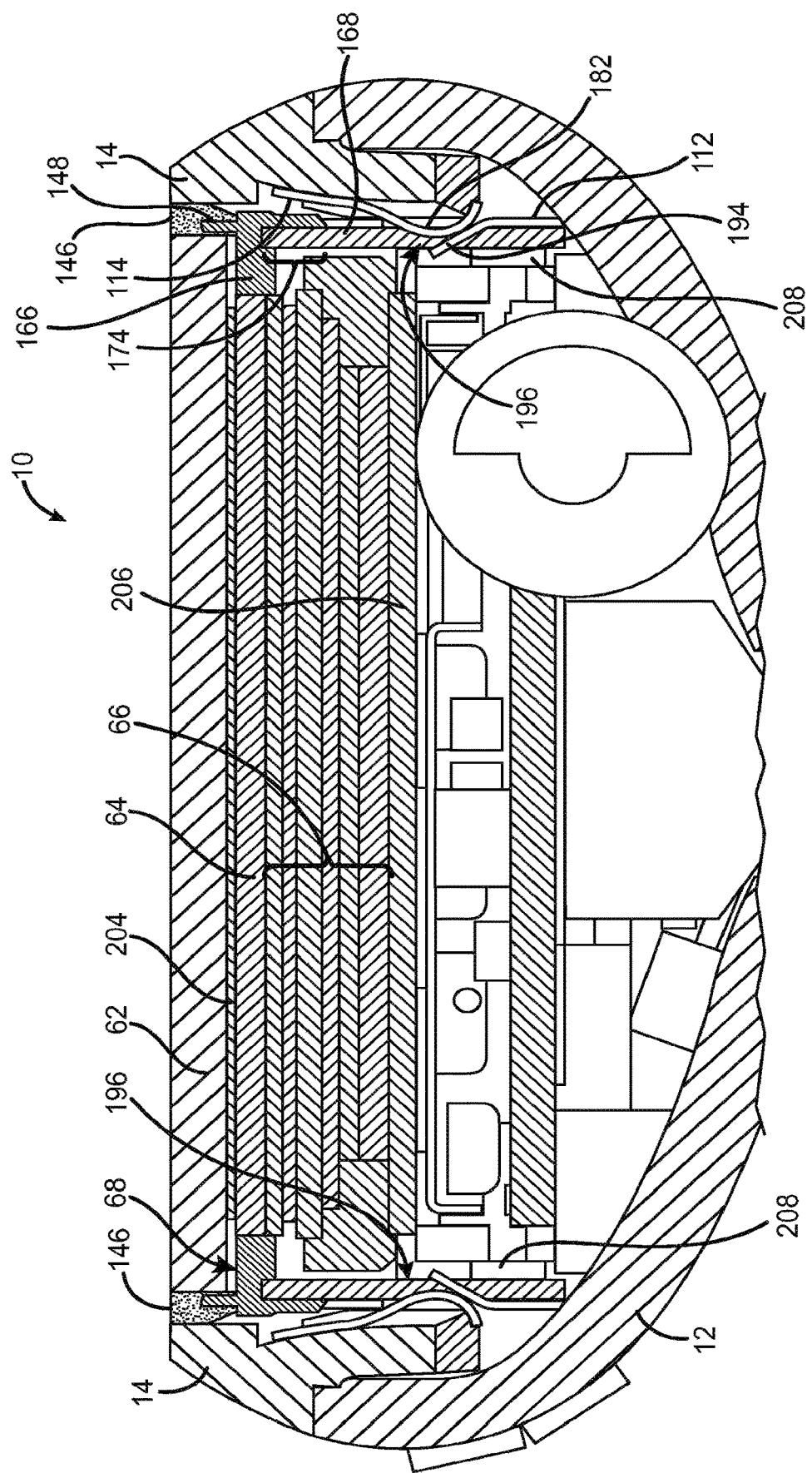
FIG. 8 is a cross-sectional end view of a portable electronic device in accordance with an embodiment of the present invention showing how springs and clips may be used to hold an upper device assembly and lower device assembly together.

A lateral cross-sectional view of an illustrative device 10 is shown in FIG. 8. As shown in FIG. 8, cover glass 62 may be mounted on top of device 10. An adhesive layer such as adhesive layer 204 may be formed between cover glass layer 62 and touch sensor 64. Touch sensor 64 may be, for example, a capacitive multitouch sensor. Touch sensor 64 may be mounted above a display unit such as liquid crystal display unit 66. Display unit 66 may be mounted above frame member 206. Frame member 206, which is sometimes referred to as a "midplate member" may be formed of a strong material such as metal (e.g., stainless steel type 304). Frame member 206 may have vertical portions 208. Vertical portions 208 may be attached to frame struts 168 by screws, other suitable fasteners, welds, adhesive, etc. Frame member 206 helps form a rigid platform for the components (such as display unit 66, sensor 64, and cover glass 62) that are associated with the tilt assembly. In addition to providing structural support, midplate frame member 206 may also provide electrical grounding (e.g., for integrated circuits, printed circuit board structures, for antennas in wireless devices 44, etc.).

Frame struts 168 may be attached to frame member 166 of frame 68. For example, frame member 166 may be formed from plastic that is molded over frame struts 168 and that engages frame struts 168 in engagement region 174. Frame protrusion 148 and gasket 146 may be used to separate glass 62 from bezel 14.

Springs 114 may be welded or otherwise mounted to bezel 14. When the tilt assembly is mounted in the housing assembly as shown in FIG. 8, spring prongs 182 may protrude into the holes such as holes 196 that are formed by bent portions 194 in clips 112. Springs 114 may also have one or more prongs that form grounding structures (e.g., to ground spring 114 and bezel 14 to midplate structures such as midplate member 206 and vertical portions 208).

Figure 9:
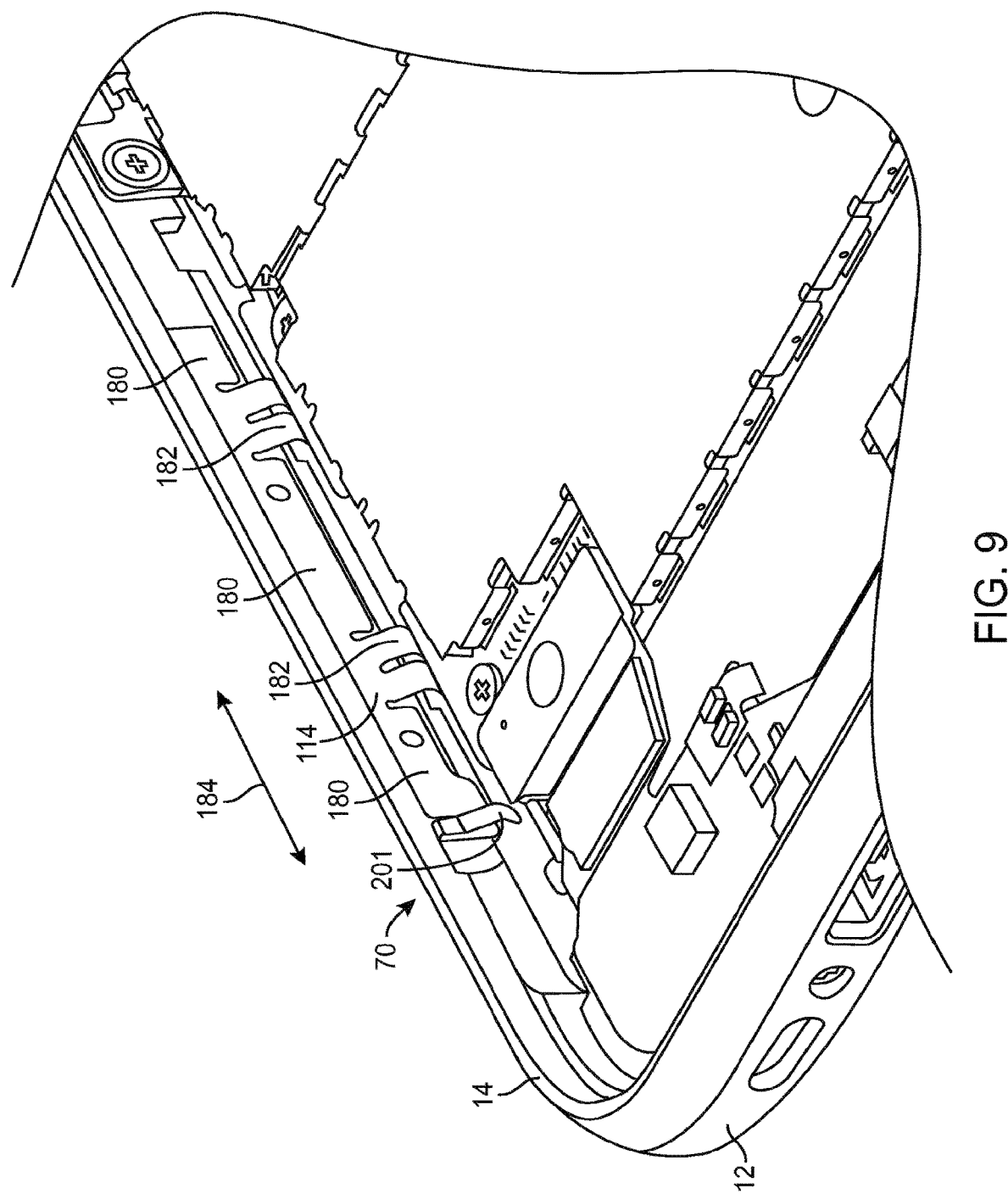
FIG. 9 is a perspective view of a portion of a lower device assembly in accordance with an embodiment of the present invention.

A perspective view of an interior portion of housing assembly 70 is shown in FIG. 9. As shown in FIG. 9, bezel 14 may be mounted to plastic housing portion 12. Spring 114 may be mounted to housing assembly 70 by welding spring 114 to bezel 14 or by otherwise attaching spring 114 securely (e.g., using fasteners, adhesive, etc.). An advantage of using springs and a bezel that are formed of metal is that this allows secure attachment mechanisms such as welds to be used to attach the springs and allows electrical paths to be formed. Satisfactory welds may be facilitated by using metals that do not have disparate properties. As an example, springs 114 may be formed from the same material or substantially the same material as bezel 14.

Springs such as spring 114 of FIG. 9 may be formed from elongated spring members such as spring member 180. Spring member 180 may be cut and bent to form spring prongs 182 and 201 (also sometimes referred to as spring members or springs). Spring prongs 182 and 201 may have any suitable shape. An advantage of forming spring prongs with relatively narrow widths (as measured along longitudinal housing dimension 184) is that this allows the springs to flex during assembly. There may be any suitable number of spring prongs in device 10. As an example, there may be one, two, three, four, five, or more than five spring prongs on the left and on the right sides of device 10. Spring prongs 182 may mate with corresponding holes in clips 112. Spring prongs such as spring prong 201 may be used as part of a grounding path. For example, spring 201 may be used to ground midplate structures 206 and 208 of FIG. 8 to bezel 14.

Springs may be mounted to the sides of housing 12 or may be mounted on other portions of housing 12 (e.g., on the edge of housing 12 that lies along lower end 106 of FIG. 7). An advantage of using springs and clips along the sides of device 10 is that this helps to ensure that cover glass 62 lies flush with the upper surfaces of bezel 14, giving device 10 an attractive finished appearance.

Figure 10:
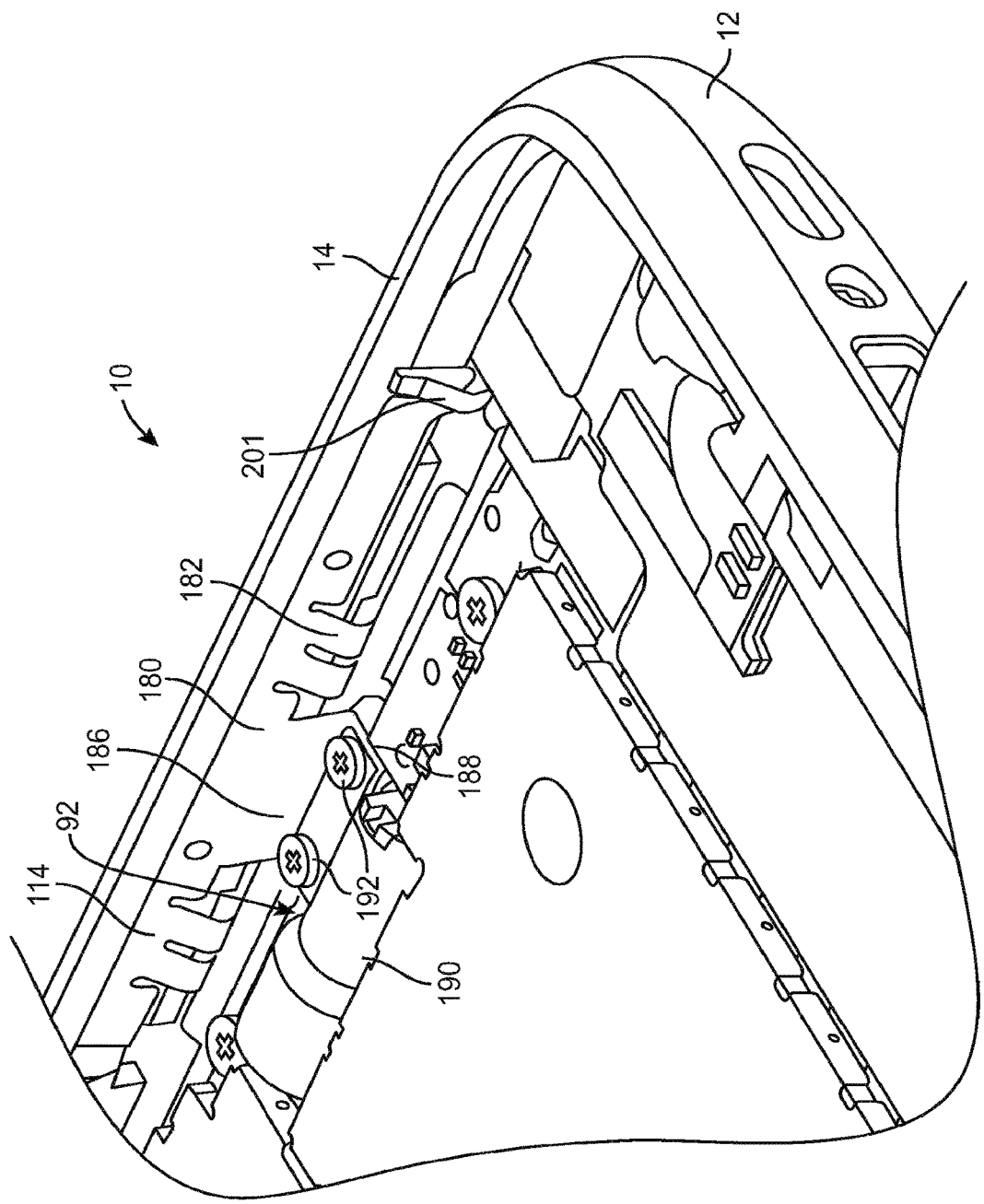
FIG. 10 is a perspective view of another portion of a lower device assembly showing a vibrator mounting structure in accordance with an embodiment of the present invention.

If desired, springs 114 (i.e., spring members such as spring member 180) may be used to form a support structure to which components in device 10 may be mounted. An arrangement of this type is shown in FIG. 10. As shown in FIG. 10, spring member 180 may have portions that form a bracket 186. Vibrator 92 (or other suitable components) may be attached to spring member 180 and device 10 using bracket 186. Bracket 186 may be formed from a bent portion of member 180 or may be formed from a separate structure that is attached to member 180. Screws such as screws 192 may be used to connect a mounting bracket such as vibrator mounting bracket 190 to bent tip portion 188 of bracket 186 to hold vibrator 92 in place. An advantage of mounting moving components such as vibrator 92 to a metal structure such as spring member 180 is that this type of arrangement may enhance the robustness of device 10 and may make device 10 less prone to failure. Arrangements of the type shown in FIG. 10 may also consume less space within the handheld device than conventional arrangements. As shown in FIG. 10, spring member 180 may have prongs such as prong 201. Prong 201 may form a grounding spring that makes electrical contact between bezel 14 and the frame of tilt assembly 60 (e.g., midplate 206 and vertical midplate members 208 of FIG. 8).

Figure 11:
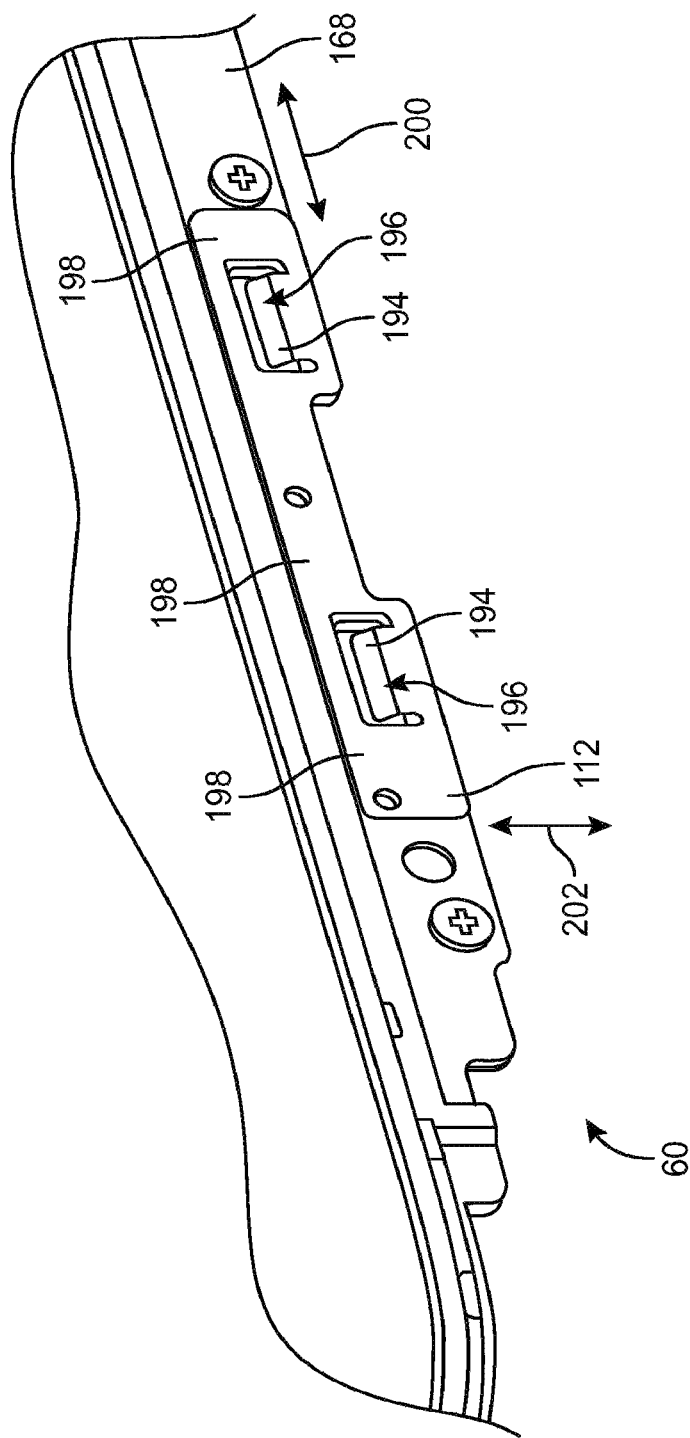
FIG. 11 is a perspective view of a portion of an upper device assembly showing clip slots in accordance with an embodiment of the present invention.

Spring prongs 182 (and 201) may flex during assembly. Following assembly, spring prongs 182 may engage clips 112 on tilt assembly 60. As shown in FIG. 11, each clip 112 may have a main elongated member 198. Elongated members such as elongated member 198 may be welded to frame struts 168 and may extend along the edge of tilt assembly 60 parallel to longitudinal dimension 200. Elongated member 198 may be substantially planar (as an example) and may have a planar surface aligned with longitudinal dimension 200 and vertical dimension 202. Portions 194 of elongated member 198 may be bent with respect to vertical dimension 202 and with respect to the planar surface defined by dimensions 202 and 200. Bending portions 194 inwardly away from the plane of elongated member 198 angles portions 194 so that bent portions 194 are angled with respect to vertical dimension 202. This forms holes 196 that can receive protruding spring prongs 182 (FIGS. 9 and 10) when tilt assembly 60 and housing assembly 70 are connected to each other. Holes may also be formed by removing portions of elongated member 198, by bending or otherwise manipulating portions of member 198 sideways or in other directions, by bending multiple portions of member 198 within each hole, etc. The arrangement of FIG. 11 in which holes 196 have been formed by bending portions 194 down and inwards is merely illustrative.

With one suitable embodiment of tilt assembly 60, there is a member such as member 198 that forms a clip on each side of tilt assembly 60. The perspective view of FIG. 11 shows an illustrative clip 112 that has been formed on the right side of tilt assembly 60.

Figure 17:
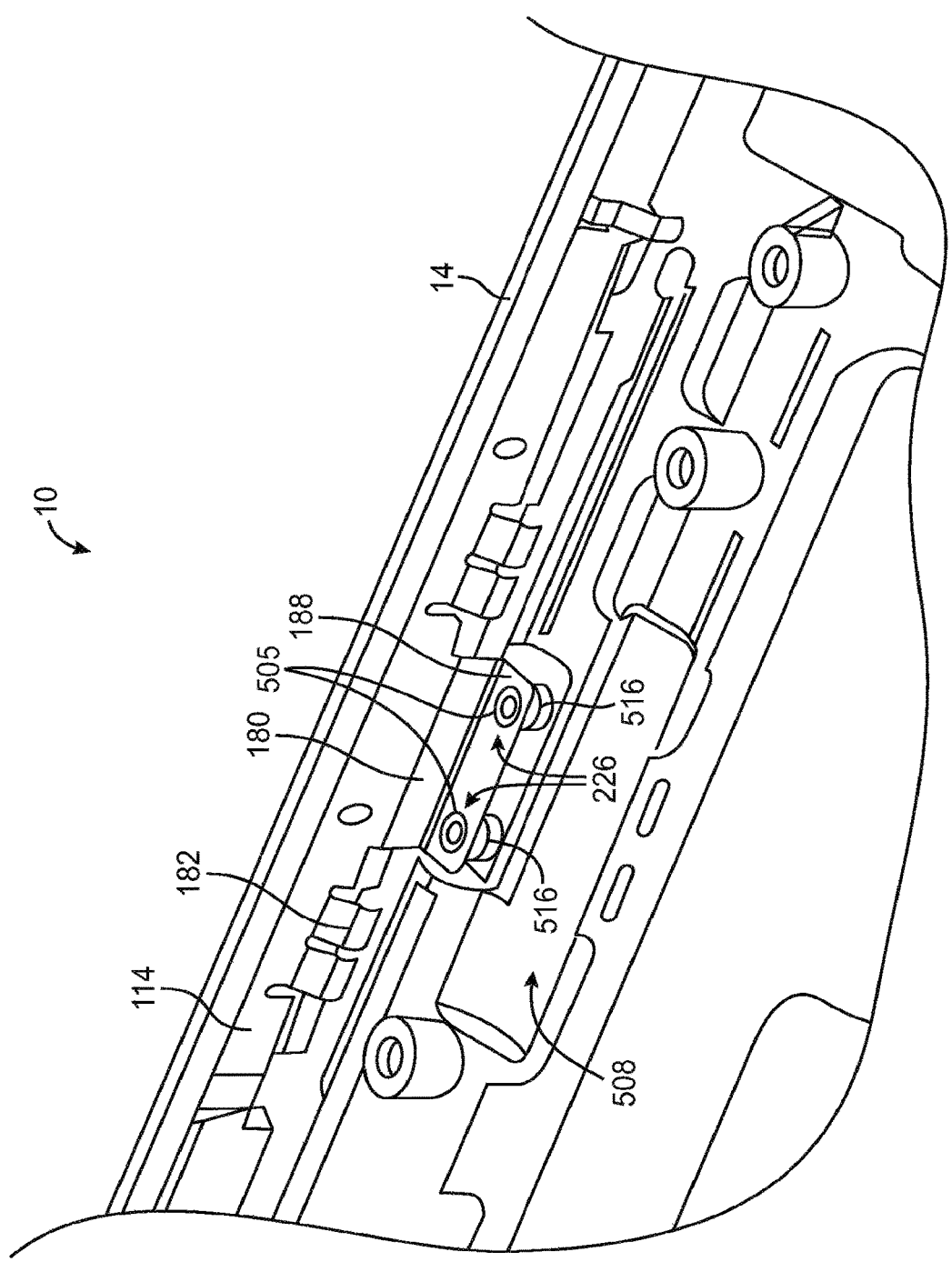
FIG. 17 is a perspective view similar to the view of FIG. 16 shown without the vibrator in accordance with an embodiment of the present invention.

As described in connection with FIG. 10, because springs 114 are attached to bezel 14 and thereby housing 12, springs 114 may be used to form a mounting structure for components such as vibrator 92. In particular, a spring such as spring 114 may be configured to form a mounting bracket 186 having a horizontal planar member 188. During component mounting operations, fasteners such as screws 192 may be inserted into holes 226 (FIG. 17).

Figure 12:
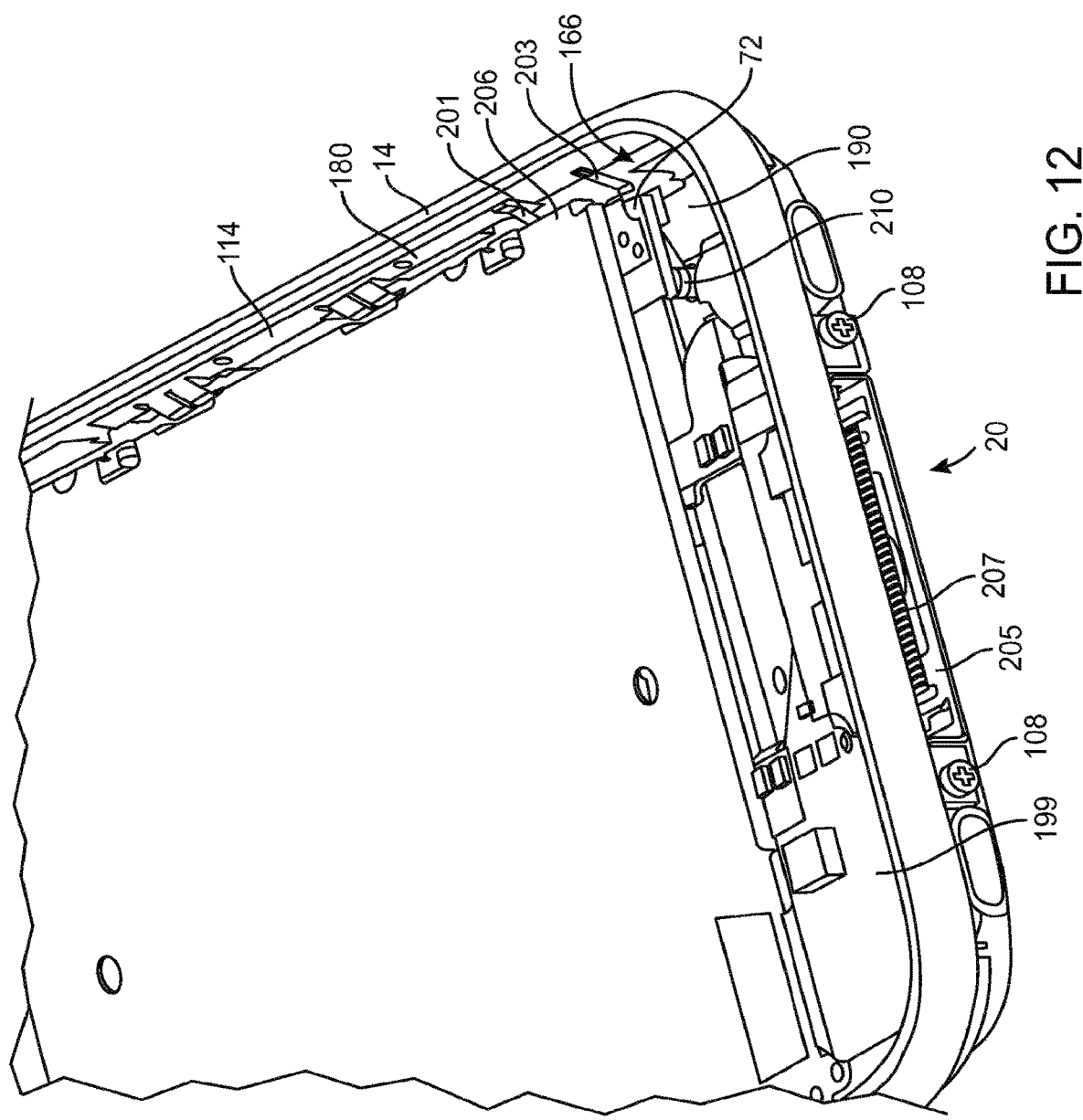
FIG. 12 is a perspective view of a portion of a handheld electronic device showing how a spring member on a lower device assembly may be used to form a ground connection to a conductive bezel in accordance with an embodiment of the present invention.

A perspective view of an end of device 10 is shown in FIG. 12. As shown in FIG. 12, a bracket-shaped conductor that is mounted to printed circuit board 72 may have a portion that forms a spring such as spring 203. Spring-loaded pin 210 may be used as a positive signal terminal that forms an electrical connection between a positive radio-frequency signal path in an antenna transmission line structure on board 72 and a flex circuit antenna resonating element. The transmission line structure may be used to interconnect the antenna resonating element to radio-frequency transceiver circuitry on the printed circuit board.

Dock connector 20 may have a conductive frame 205 (e.g., a metal frame), and pins 207. Pins 207 may be electrically connected to corresponding traces in dock connector flex circuit 199.

Midplate 206 may be formed from metal and may form part of tilt assembly 60. Structures 208 (FIG. 8) may form vertical portions of midplate 206. Midplate 206 may be used to provide structural support for components such as display 16 in tilt assembly 60. With one suitable arrangement, midplate 206 may be formed from a conductive material such as metal. Electrical components in device 10 (e.g., the display, touch screen, etc.) may be grounded to midplate 206. Spring 201 on spring member 180 of spring 114 may be used to electrically connect (ground) midplate 206 (and the components that are grounded to midplate 206) to bezel 14 or other suitable conductive housing structures.

As described in connection with FIG. 10, a vibrator such as vibrator 92 may be mounted in device 10. Vibrator 92 may be used, for example, to alert a user of device 10 when an incoming telephone call is received.

Figure 13:
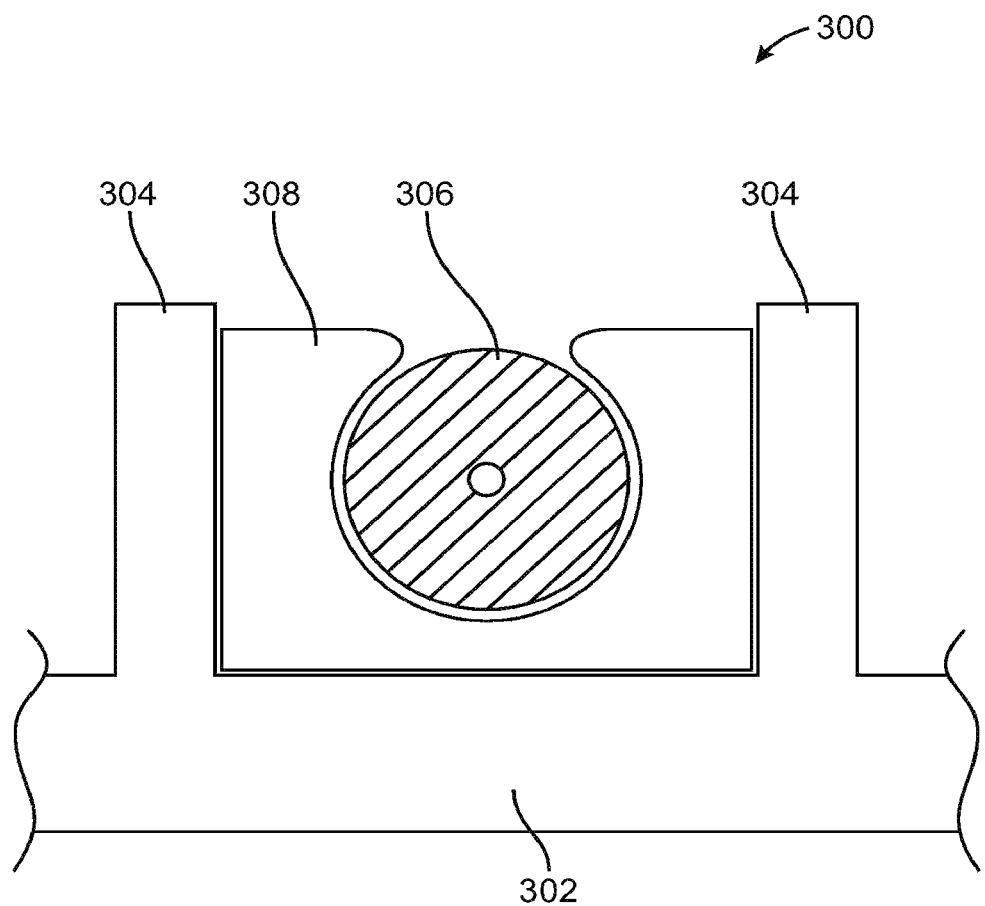
FIG. 13 is a cross-sectional side view of a conventional vibrator mounting arrangement.

A conventional vibrator mounting assembly in a handheld device is shown in FIG. 13. Conventional vibrator mounting assembly 300 of FIG. 13 has a vibrator 306 housed within boot 308. Boot 308 is press fit between two legs 304. Legs 304 are attached to housing structure 302. Vibrator 306, which has electrical connections to device circuitry, vibrates when signaled, such as when a phone call is being received. Boot 308 is made from an elastomeric material. Because boot 308 has elasticity, boot 308 tends to dampen vibrations from vibrator 306 before these vibrations are conveyed to legs 304. This tends to reduce the efficiency of conventional vibrator mounting structures of the type shown in FIG. 13. Legs 304 also consume a relatively large amount of space within the device.

Figure 14:
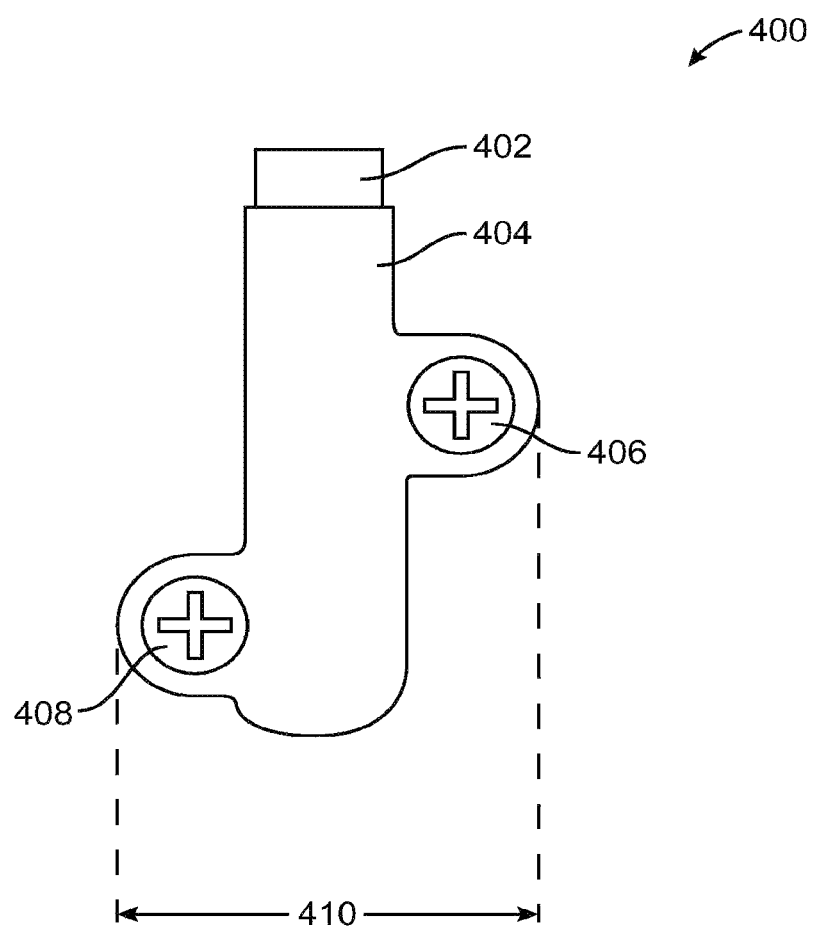
FIG. 14 is a top view of another conventional vibrator mounting arrangement.

FIG. 14 illustrates another conventional vibrator mounting arrangement. In the FIG. 14 arrangement, vibrator 402 is mounted to a housing using bracket 404. Vibrator assembly 400 has screws 406 and 408 that attach bracket 404 and vibrator 402 to the housing. Welds may also be used in attaching vibrator 402. Assemblies such as assembly 400 of FIG. 14 tend to consume large amounts of horizontal space, as indicated by arrow 410.

Figure 15:
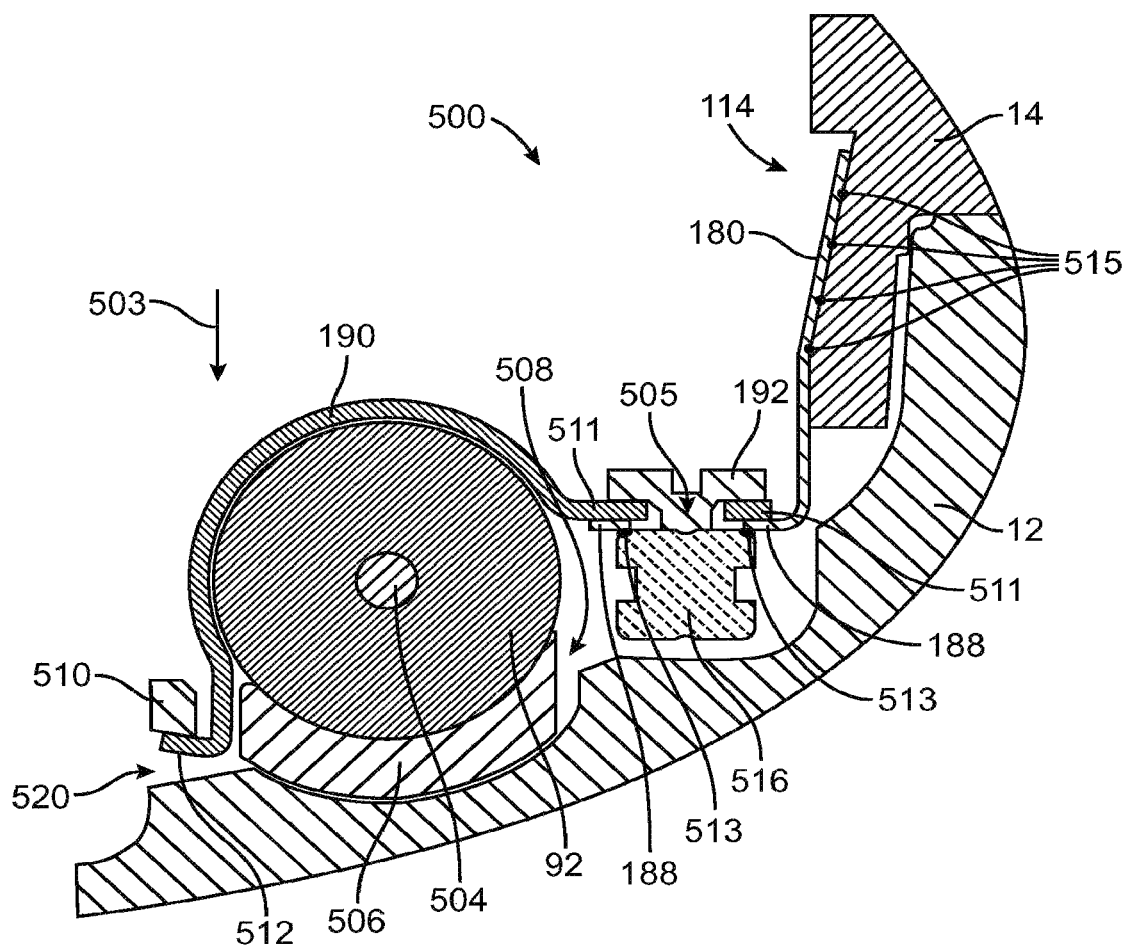
FIG. 15 is a cross-sectional side view of a vibrator mounting structure having a mounting bracket and an elastomeric support member in accordance with an embodiment of the present invention.

FIG. 15 is a schematic view of a vibrator mounting assembly in accordance with an embodiment of the present invention. Arrangements of the type shown i FIG. 15 may consume less space than conventional arrangements. Assembly 500 may receive structural support from housing 12 and bezel 14. Vibrator 92 may have a motor that spins a weight around vibrator axis 504. The weight is typically off the center of axis 504, so that vibrator 92 vibrates.

Vibrator 92 may rest in a cavity such as vibrator cavity 508 on an elastomeric support such as biasing member 506. Member 506 may help bias vibrator 92 upwards against bracket 190. Mounting bracket 190 may bias vibrator 92 downwards in the general direction of arrow 503. Mounting bracket 190 may be attached to housing 12 using any suitable technique. For example, hook 512 of bracket 190 may engage portion 510 of housing 12 through a slot or other hole 520. Screws such as screw 192 may hold down bracket 190 at its other end 511. A screw receiving member such as threaded metal insert 516 may receive screw 192 through holes 505 in bracket 190 and portions 188 of spring 114. Metal insert 516 may be welded to horizontal portions 188 of spring member 180 at weld points such as weld points 513. Spring member 180 may be connected to bezel 14 by welds (e.g., welds at points such as weld points 515). Inserts such as insert 516 may include threaded holes into which screws 192 may be screwed during assembly.

Figure 16:
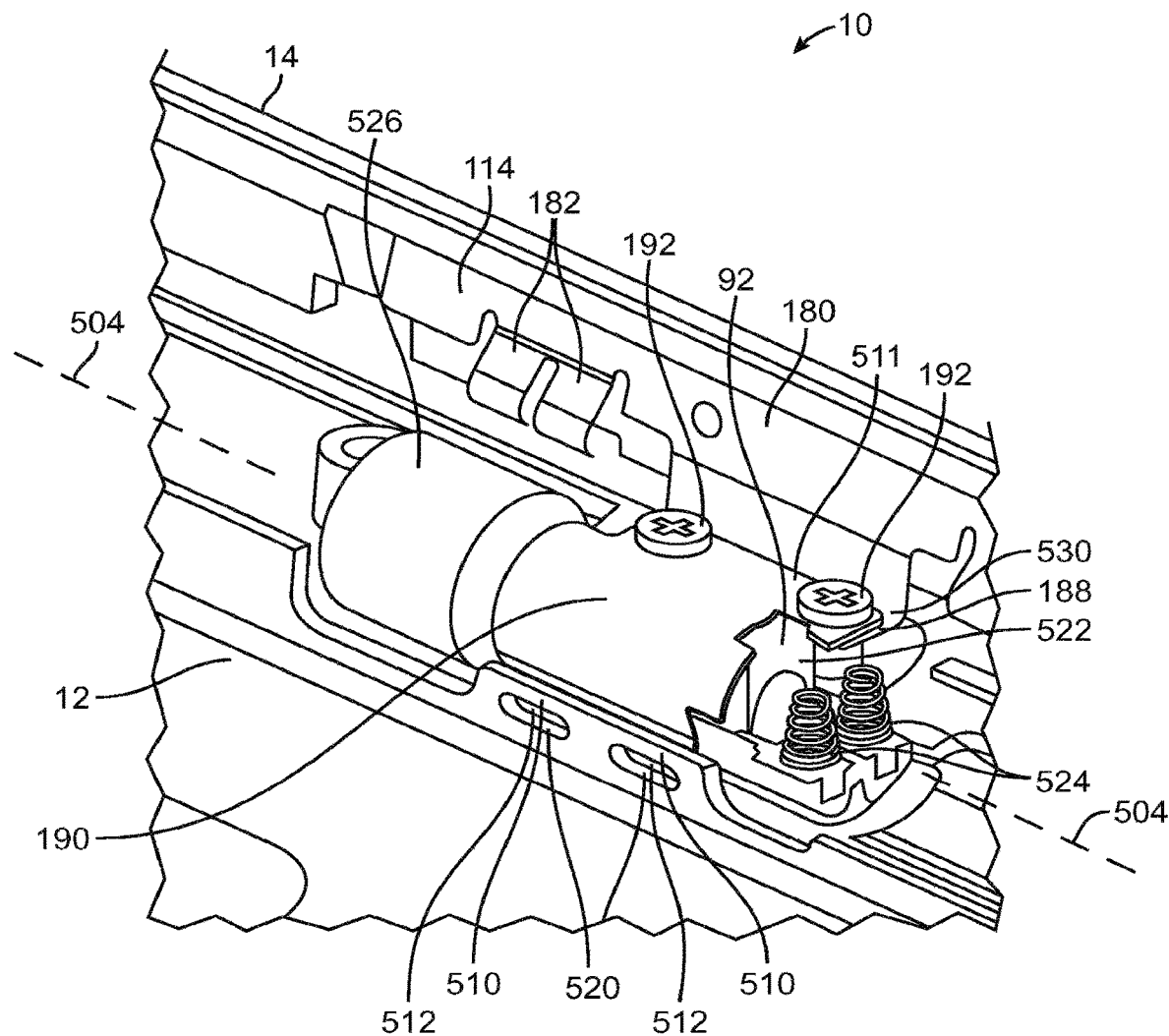
FIG. 16 is a perspective view of an interior portion of a portable device showing how a vibrator may be mounted using a spring member and bracket in accordance with an embodiment of the present invention.

A perspective view of a portion of device 10 in the vicinity of vibrator 92 is shown in FIG. 16. As shown in FIG. 16, vibrator 92 may be mounted beneath mounting bracket 190. One end of bracket 190 may have hooks 512 that pass through holes 520 in housing 12 and engage the undersides of housing portions 510. Bracket portions 511 at the other end of bracket 190 may be secured by screws 192. Vibrator 92 may have a motor such a motor 522 that spins a weight such as weight 526 about axis 523. Weight 526 may be mounted off center, so that vibrations are crated as weight 526 spins about axis 504.

Spring 114 may have spring prongs 182 that mate with the clips on tilt assembly 60. Spring member 180 of spring 114 may have a bend such as bend 530 that forms horizontal support bracket portions 188 of spring 114. Support bracket portions 188 may support vibrator mounting bracket 190. Electrical contacts such as springs 524 may be used to make electrical contact between the power leads of vibrator 92 and control circuitry (e.g., pads on an overlapping circuit board).

Springs such as spring 114 of FIG. 16 may be attached to bezel 14 (e.g., by welds). Bezel 14 may, in turn, be attached to housing 12 (e.g., using a plastic overmolding process, using screws or other fasteners, using adhesive, using a combination of these attachment techniques, etc.). Portion 188 of spring 114 may therefore form a horizontal mounting structure that helps attach vibrator 92 to housing structure 12. If desired, other electrical components (e.g., a camera, speaker, microphone, etc.) may be attached using one or more brackets such as bracket 190 and bracket portion 188. The use of bracket 190 and portion 188 of spring 114 to attach vibrator 92 to housing 12 is merely illustrative.

FIG. 17 is a perspective view of device 10 in the vicinity of spring member portion 188. The FIG. 17 view is similar to the view of FIG. 16, but vibrator 92 is not present so that threaded holes 226 of metal inserts 516 and holes 505 in portions 188 are not obscured by vibrator 92. During component mounting operations, fasteners such as screws 192 of FIG. 15 may be screwed into holes 226.

Figure 18:
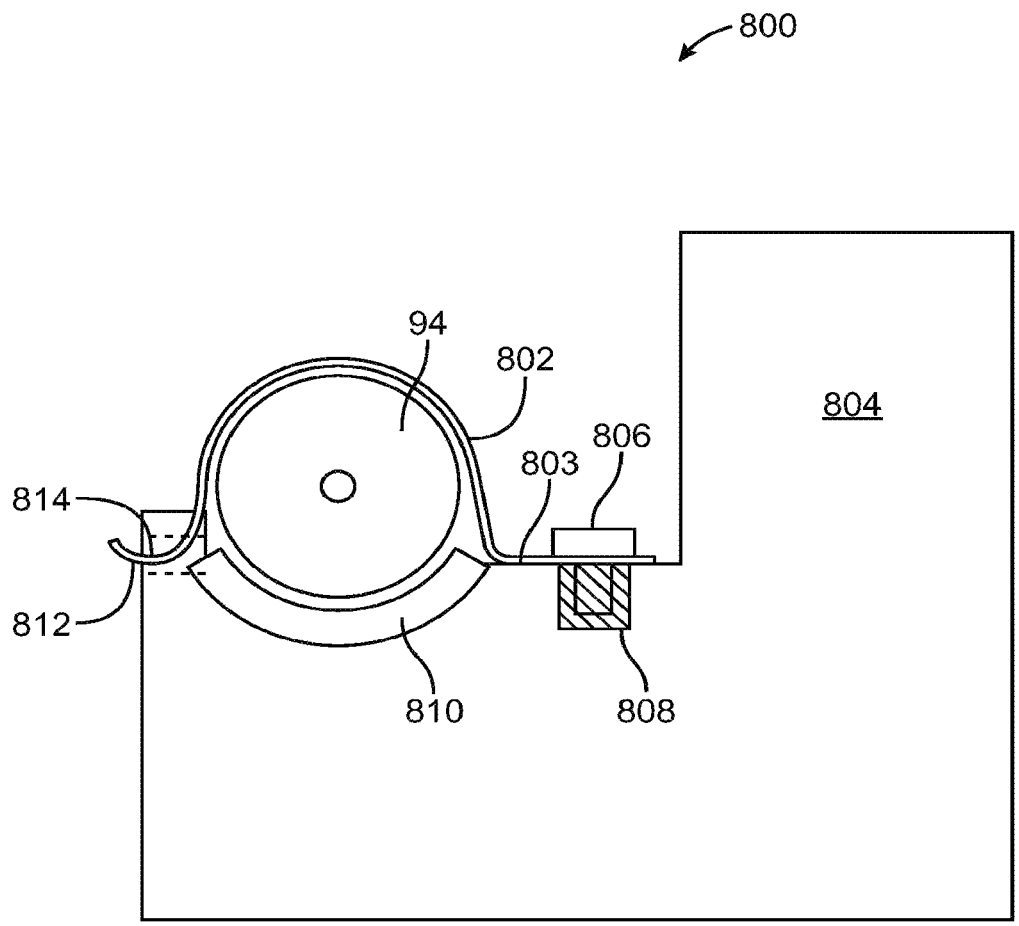
FIG. 18 is a cross-sectional end view of a portion of a portable electronic device in which a vibrator has been mounted using a bracket screwed into a housing structure in accordance with an embodiment of the present invention.

If desired, vibrator 92 may be mounted using a bracket that is not directly connected to springs 114. This type of arrangement is shown in the cross-sectional view of FIG. 18. As shown in FIG. 18, in vibrator mounting assembly 800, vibrator 92 may be mounted to housing 804 (e.g., housing 12 of FIG. 1) using bracket 802. Bracket 802 may bias vibrator 92 downwards towards elastomeric support 810. Elastomeric support 810 may bias vibrator 92 upwards towards bracket 802. Bracket 802 may have one end 812 that engages hole 814 in housing 804 and another end 803 that is held in place by screws such as screw 806. Screws such as screw 806 may be screwed into threaded metal inserts such as threaded metal insert 808. Metal insert 808 may be connected to housing 804 (e.g., using fasteners, a press fit, adhesive, an overmolding process, etc.).

Figure 19:
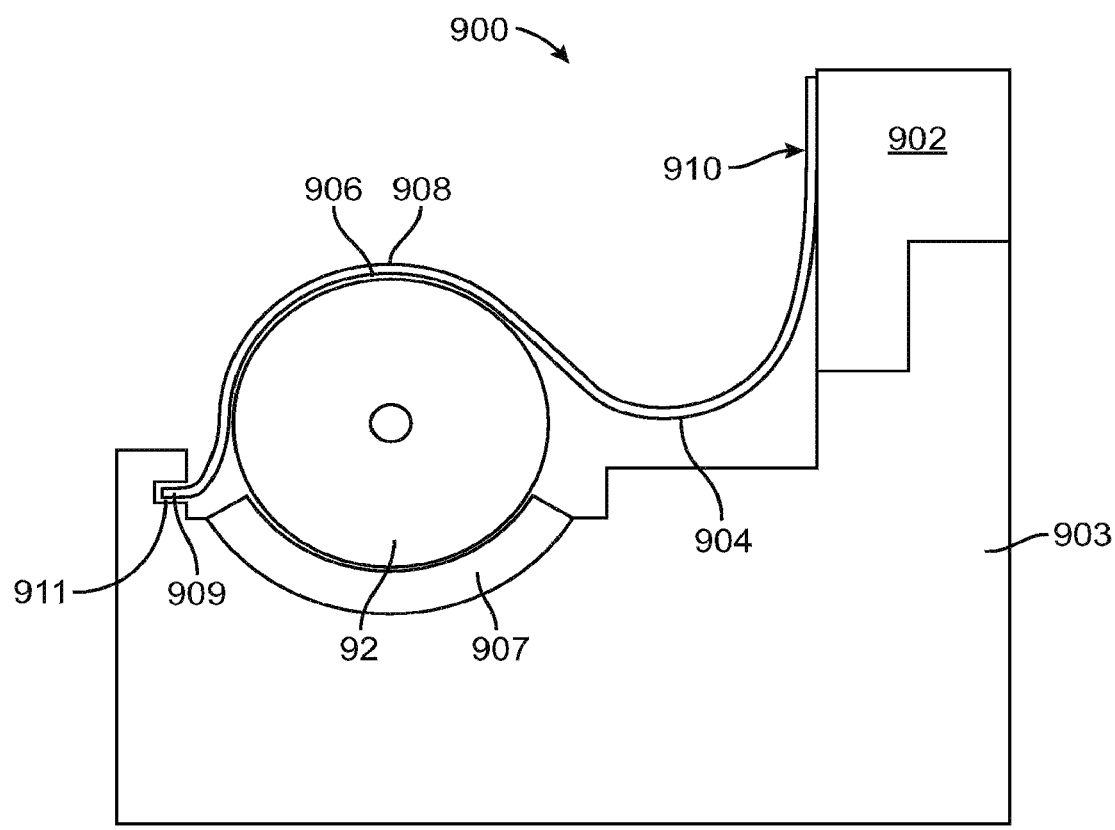
FIG. 19 is a cross-sectional end view of a portion of a portable electronic device in which a vibrator has been mounted using a bracket attached to a housing structure by a weld joint in accordance with an embodiment of the present invention.

Screws such as screw 806 and 192 may, if desired, be omitted. An illustrative vibrator mounting arrangement in which the bracket mounting screws have been omitted is shown in FIG. 19. As shown in FIG. 19, bracket 904 of mounting structures 900 may have a portion 908 that biases vibrator 92 downwards towards elastomeric support 907 on device housing 903. Elastomeric support 907 may bias vibrator 92 upwards towards portion 908 of bracket 904. Bracket 904 may have an end portion such as end 909 that engages a hole such as hole 911 in housing 903. Housing 903 may be connected to bezel 902 (e.g., a conductive bezel formed from metal or other suitable materials). Bracket 904 may be connected to bezel 902 without using screws (as an example). With one suitable arrangement, portion 910 of bracket 904 may be welded or otherwise attached to bezel 902.

If desired, welds may be formed between vibrator 92 and mounting brackets in device 10. For example, portion 908 of bracket 904 may be welded to vibrator 92 at weld location 906. Elastomeric biasing members such as biasing member 907 (FIG. 19), 810 (FIG. 18), and 506 (FIG. 15) may be omitted or biasing members for vibrator 92 may be formed using other device structures. For example, biasing members for vibrator 92 may be formed from coil springs, leaf springs, bent metal structures (e.g., bent brackets), etc.

The process of assembly device 10 from numerous components may be complex. Accordingly, it may be desirable to form device 10 from multiple subassemblies. As an example, device 10 may be formed from tilt assembly 60 and housing assembly 70. In turn, these assemblies may each be formed from one or more subassemblies.

As an example, a subassembly may be formed using a speaker enclosure or other internal support structure. Components that may be mounted to this type of assembly include a speaker (e.g., a speaker such as speaker 78 of FIG. 3 for port 22 that is housed within the speaker enclosure), a microphone such as microphone 76, a dock connector such as dock connector 20, and an antenna (e.g., a flex circuit antenna containing one or more conductive antenna resonating element traces). An assembly of this type, which may sometimes be referred to as an acoustic module, may be manufactured as a separate stand-alone portion of device 10, thereby facilitating testing and enhancing manufacturability.

Figure 20:
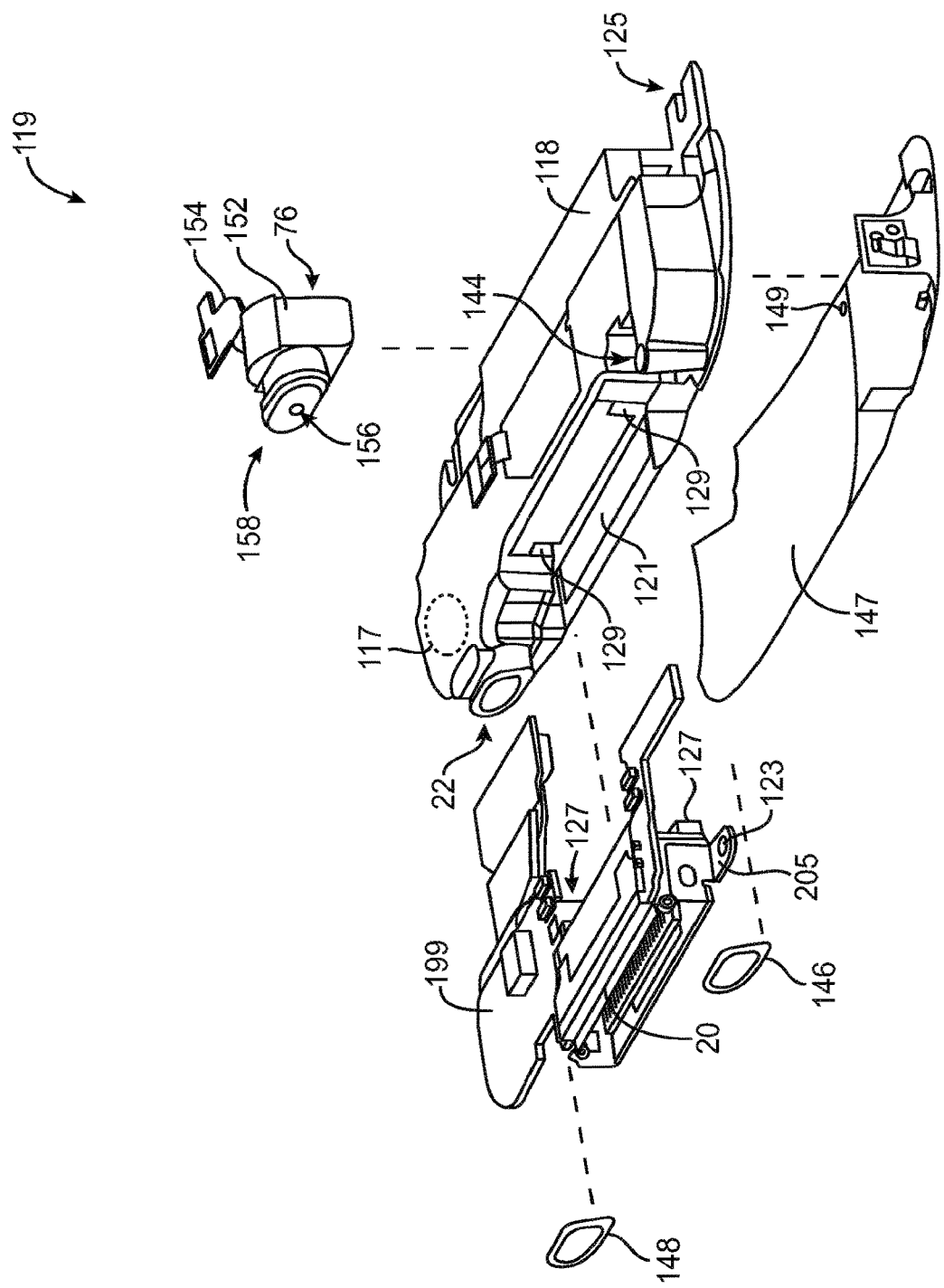
FIG. 20 is an exploded perspective view of an illustrative speaker enclosure and associated components in accordance with an embodiment of the present invention.

An exploded perspective view of an illustrative acoustic module is shown in FIG. 20. As shown in FIG. 20, acoustic module 119 may include a speaker enclosure such as speaker enclosure 118. Speaker enclosure 118 may be formed from one or more molded plastic parts (as an example). Speaker enclosure 118 may be substantially sealed except for an opening for port 22. Speaker 78 (FIG. 3) may be mounted within speaker enclosure 118 (in the region under dashed lines 117), so that one side of the speaker faces port 22 and the other side of the speaker faces the sealed hollow interior of enclosure 118. In this type of configuration, speaker enclosure 118 may serve as a closed speaker box that improves speaker performance.

As shown in FIG. 20, components such as microphone 76, antenna flex circuit 147, and dock connector 20 (and associated dock connector flex circuit 199 and circuit components on flex circuit 199) may be mounted on speaker enclosure 118. In this capacity, speaker enclosure 118 may serve as a unifying assembly for multiple parts of device 10.

If desired, a mesh cover 148 (e.g., metal mesh) may be placed over opening 22. If desired, a layer of acoustic mesh may be placed behind mesh 148. Mesh 146 (e.g., a metal mesh) may be used to cover microphone 76. If desired, a layer of acoustic mesh may be placed behind mesh 146. The acoustic mesh may be formed from a plastic mesh material that has smaller mesh openings than the metal mesh (as an example).

Microphone 76 may have an associated support structure 152 (sometimes referred to as a "boot"). Structure 152 may be formed of any suitable material. With one suitable arrangement, structure 152 is formed from an elastomeric material such as silicone. This allows structure 152 to form good environmental seals with enclosure 118 and other portions of device 10.

During assembly, microphone boot 152 may be mounted in a mating hole such as hole 144 within speaker enclosure 118. Hole 144 may have features that engage boot 152 and that help to form seals between boot 152 and enclosure 118. These seals and associated seals formed between boot 152 and the walls of housing 12 may help prevent intrusion of moisture or particles into the interior of device 10. Region 158 of boot 152 may have one or more sealing features such as raised ribs. These sealing features may help to enhance the quality of the seal formed between boot 152 and housing 12. One or more holes such as hole 156 may be used to allow sound to enter microphone 76. Flex circuit 154 may be used to interconnect microphone 76 with circuitry in device 10.

Antenna structure 147 may be formed from a layer of flex circuit (e.g., a flexible circuit substrate formed from polyimide or other suitable flexible dielectric). The flex circuit layer may include one or more conductive antenna resonating element traces (e.g., traces of copper or other suitable conductor suitable for forming an antenna). The underside of enclosure 118 may have a planar surface or a surface with one or more non-planar features. As an example, the underside of enclosure 118 may have a generally planar surface with slightly curved edges to conform to a comparably shaped housing 12. Antenna resonating element flex circuit 147 may be connected to the underside of enclosure 118 using adhesive (e.g., double-sided adhesive film), or other suitable attachment mechanisms. In this type of arrangement, enclosure 118 forms a support structure for antenna resonating element flex circuit 147 that helps to define the shape of the antenna for device 10 and that helps to locate the antenna structure within device 10. If desired, antenna flex circuit 147 may have alignment features such as hole 149 that mate with corresponding pegs or other alignment features on the underside of enclosure 118.

Dock connector 20 may be mounted to enclosure 118 on ledge portion 121 of enclosure 118. Ledge portion 121 may be formed from a recess of any suitable shape. In the example of FIG. 20, recess 121 has a shape with vertical and horizontal sides. This is, however, merely illustrative.

Any suitable attachment mechanism may be used to secure dock connector 20 to enclosure 118 (e.g., adhesive, fasteners, alignment features, etc.). Dock connector flex circuit 199 may be rigidly attached to dock connector 20. For example, adhesive on the underside of dock connector flex circuit 199 may be used to connect dock connector flex circuit 199 to enclosure 118. This may help to attach dock connector 20 to enclosure 118. If desired, dock connector 20 may have alignment posts such a posts 127 that mate with matching alignment holes 129 on speaker enclosure 118. Inserting posts 127 into holes 129 may also help to attach dock connector 20 to enclosure 118. During assembly, acoustic module 119 may be attached to other portions of device 10 (e.g., housing assembly 70) using screws that pass through dock connector holes such as holes 123 in dock connector frame member 205. Enclosure 118 may also have features such as slot 125 that may be used when mounting acoustic module 119 within device 10.

Figure 21:
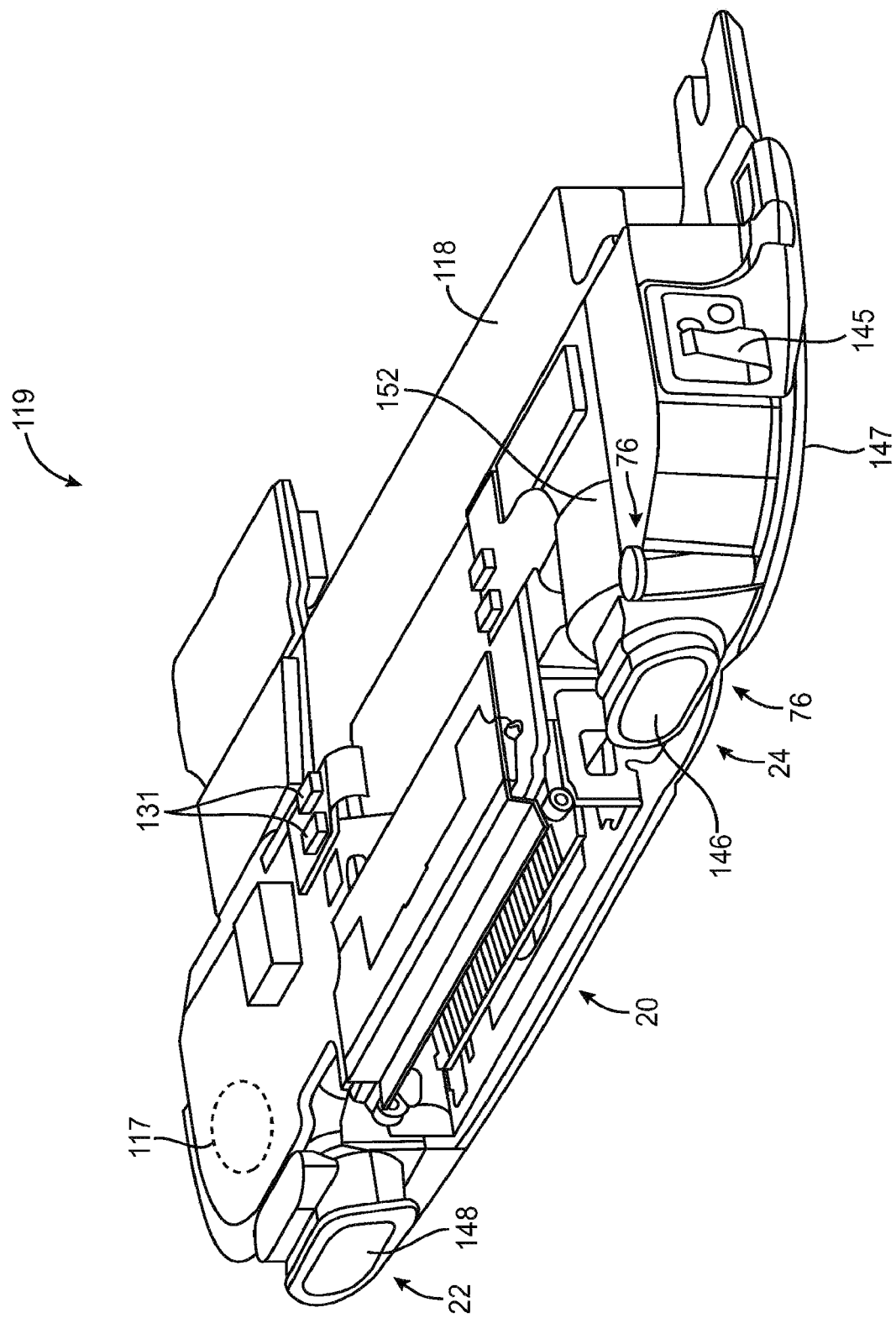
FIG. 21 is a perspective view of an illustrative speaker enclosure and associated components that have been mounted to the speaker enclosure to form a unitary assembly for a portable electronic device in accordance with an embodiment of the present invention.

FIG. 21 shows a finished acoustic module 119 to which dock connector 20, microphone 76, and antenna resonating element 147 have been mounted. A speaker for speaker port 22 may be mounted to the inside of closed box speaker enclosure 118 (e.g., under the region defined by dashed lines 117). Solder terminals 131 may be used to make electrical connection to the speaker within speaker enclosure 118. Antenna flex circuit 147 may have a ground clip such as ground spring 145 that is used in grounding the antenna resonating element traces within flex circuit 147.

If desired, additional components may be mounted to speaker enclosure 118 to form a subassembly for device 10 that contains more parts or fewer components may be mounted to speaker enclosure 118 to form a subassembly for device 10 that contains fewer parts. Different components may also be attached to speaker enclosure 118 (in additional to or instead of the illustrative components of FIGS. 20 and 21).

The foregoing is merely illustrative of the principles of this invention and various modifications can be made by those skilled in the art without departing from the scope and spirit of the invention.

What is claimed is:

1. A mobile phone, comprising:
   a housing assembly defining:
   a first retention feature; and
   a side wall defining a first fastener opening, a second fastener opening, and a connector opening positioned between the first fastener opening and the second fastener opening;
   a display assembly coupled to the housing assembly and comprising:
   a frame;
   a display coupled to the frame;
   a protective cover positioned over the display and coupled to the frame;
   a touch sensor positioned between the display and the protective cover;
   a second retention feature positioned along a peripheral portion of the display assembly and engaged with the first retention feature to retain the display assembly to the housing assembly;
   a third retention feature positioned along the peripheral portion of the display assembly and secured to the housing assembly with a first threaded fastener that extends through the first fastener opening to engage the third retention feature; and
   a fourth retention feature positioned along the peripheral portion of the display assembly and secured to the housing assembly with a second threaded fastener that extends through the second fastener opening to engage the fourth retention feature; and
   an electrical connector that is positioned within the mobile phone and accessible through the connector opening.

2. The mobile phone of claim 1, wherein:
   the housing assembly defines a rear surface of the mobile phone;
   the protective cover defines substantially an entire front surface of the mobile phone; and
   the side wall extends around substantially an entire periphery of the mobile phone.

3. The mobile phone of claim 1, wherein the connector opening is configured to receive at least a portion of a charging connector of a charging cable.

4. The mobile phone of claim 1, wherein:
   the mobile phone has a generally rectangular shape defined at least in part by:
   a top peripheral side; and
   a bottom peripheral side opposite the top peripheral side;
   the second retention feature is positioned along the top peripheral side; and
   the third retention feature is positioned along the bottom peripheral side.

5. The mobile phone of claim 1, wherein the display assembly further comprises a clip positioned along a side of the display assembly and engaged with the housing assembly to retain the display assembly to the housing assembly.

6. A handheld electronic device, comprising:
   a housing assembly defining:
   a cavity;
   a first retention feature; and
   a side wall defining a first fastener opening and a second fastener opening; and
   a display assembly positioned at least partially within the cavity and comprising:
   a frame;
   a display coupled to the frame;
   a protective cover coupled to the frame and defining substantially an entire front surface of the handheld electronic device;
   a second retention feature engaged with the first retention feature to retain the display assembly to the housing assembly;
   a third retention feature secured to the housing assembly with a first fastener that extends through the first fastener opening to engage the third retention feature; and
   a fourth retention feature secured to the housing assembly with a second fastener that extends through the second fastener opening to engage the fourth retention feature; wherein:

the housing assembly further defines a connector opening positioned between the first fastener opening and the second fastener opening and configured to receive at least a portion of a charging connector of a charging cable.

7. The handheld electronic device of claim 6, wherein the side wall extends around substantially an entire periphery of the handheld electronic device.

8. The handheld electronic device of claim 6, wherein:
the first retention feature is a recess; and
the second retention feature is a protrusion.

9. The handheld electronic device of claim 8, wherein the protrusion and the recess are configured to allow the display assembly to rotate relative to the housing assembly while the protrusion and the recess remain engaged.

10. The handheld electronic device of claim 8, wherein the third retention feature is a tab extending from the display assembly.

11. The handheld electronic device of claim 10, wherein:
the first fastener is a threaded fastener; and
the tab defines a threaded opening configured to engage with the threaded fastener.

12. The handheld electronic device of claim 6, wherein:
the second retention feature is positioned along a first side of the display assembly; and
the third retention feature is positioned along a second side of the display assembly, the second side parallel to the first side.

13. A mobile phone, comprising:
a housing assembly defining a first retention feature and comprising:
　a back side; and
　a wall extending around a periphery of the back side and defining:
　　a first hole extending through the wall;
　　a second hole extending through the wall; and
　　a connector opening positioned between the first hole and the second hole;
a display assembly coupled to the housing assembly and comprising:
　a frame;
　a touch screen display coupled to the frame;
　a protective cover coupled to the frame and covering the touch screen display;
　a second retention feature engaged with the first retention feature;
　a third retention feature defining a first threaded opening; and
　a fourth retention feature defining a second threaded opening;
a first threaded fastener extending through the first hole and engaged with the first threaded opening of the third retention feature to secure the display assembly to the housing assembly; and
a second threaded fastener extending through the second hole and engaged with the second threaded opening of the fourth retention feature to secure the display assembly to the housing assembly; and
an electrical connector positioned within the mobile phone, and accessible through the connector opening.

14. The mobile phone of claim 13, wherein:
the wall further defines:
　a first segment defining a top side of the mobile phone; and
　a second segment defining a bottom side of the mobile phone, the second segment parallel to the first segment;
the first hole extends through the wall along the second segment;
and
the first retention feature is positioned along the first segment.

15. The mobile phone of claim 14, wherein:
the wall further defines:
　a third segment defining a left side of the mobile phone; and
　a fourth segment defining a right side of the mobile phone; and
the display assembly further comprises:
　a fifth retention feature engaged with the housing assembly along the third segment of the wall; and
　a sixth retention feature engaged with the housing assembly along the fourth segment of the wall.

16. The mobile phone of claim 13, wherein the electrical connector is a charging connector positioned within the mobile phone and accessible through the connector opening.

* * * * *